(12) United States Patent
Elton et al.

(10) Patent No.: US 9,025,897 B1
(45) Date of Patent: May 5, 2015

(54) METHODS AND APPARATUS FOR ADAPTIVE AUTO IMAGE BINARIZATION

(71) Applicants: John H Elton, Atlanta, GA (US); Stephen A Martucci, Kendall Park, NJ (US)

(72) Inventors: John H Elton, Atlanta, GA (US); Stephen A Martucci, Kendall Park, NJ (US)

(73) Assignee: Accusoft Corporation, Tampa, FL (US)

( * ) Notice: Subject to any disclaimer, the term of this patent is extended or adjusted under 35 U.S.C. 154(b) by 214 days.

(21) Appl. No.: 13/857,605

(22) Filed: Apr. 5, 2013

(51) Int. Cl.
  *G06K 9/00* (2006.01)
  *G06K 9/36* (2006.01)
  *G06K 9/46* (2006.01)
  *G06T 5/00* (2006.01)

(52) U.S. Cl.
  CPC ........................................ *G06T 5/00* (2013.01)

(58) Field of Classification Search
  CPC ... G06K 9/34; G06K 9/38; G06T 2207/20148
  USPC .......................... 382/164, 173, 237, 251, 270
  See application file for complete search history.

(56) References Cited

U.S. PATENT DOCUMENTS

| | | | | |
|---|---|---|---|---|
| 5,537,485 A * | 7/1996 | Nishikawa et al. | ............ | 382/130 |
| 6,333,993 B1 * | 12/2001 | Sakamoto | ...................... | 382/173 |
| 6,577,762 B1 * | 6/2003 | Seeger et al. | .................. | 382/173 |
| 2010/0073735 A1 * | 3/2010 | Hunt et al. | ...................... | 358/462 |
| 2010/0092087 A1 * | 4/2010 | Cooksey et al. | .............. | 382/176 |
| 2010/0158373 A1 * | 6/2010 | Li et al. | ........................ | 382/172 |

OTHER PUBLICATIONS

Sezgin et al. ("Survey over image thresholding techniques and quantitative performance evaluation," Journal of Electronic Imaging, 13(1), Jan. 2003).*

Zhang et al. ("Fast Document Image Binarization based on an improved adaptive Otsu's method and destination word accumulation," Journal of Computational Information System 7:6, 2011).*

* cited by examiner

*Primary Examiner* — Yubin Hung
(74) *Attorney, Agent, or Firm* — Straub & Pokotylo; Michael P. Straub; Stephen T. Straub

(57) ABSTRACT

Bi-level pixel values are generated from a set of input pixel values corresponding to an image. Various described methods and apparatus are well suited for applications with limited computational capability and/or limited available resources to be used for performing image processing. Corresponding to an individual input pixel being processed, a plurality of windows including the pixel are evaluated to determine statistics including a variance for each window. Based upon the determined variances, one of a plurality of binarization threshold generation functions is selected. A binarization threshold for the input pixel is determined using the selected binarization threshold generation function. A bi-level pixel value is generated based on a comparison of the input pixel value to the generated binarization threshold. In various embodiments, the binarization threshold determination functions use non-zero integer powers of one or more variances, and intentionally avoid performing a square root operation, thus limiting computational complexity.

20 Claims, 16 Drawing Sheets

EXAMPLE OF CENTERED WINDOWS

EXAMPLE 1 OF OFF-CENTER WINDOWS

EXAMPLE 2 OF OFF-CENTER WINDOWS

| FIGURE 7A |
| FIGURE 7B |
| FIGURE 7C |

METHODS AND APPARATUS FOR ADAPTIVE AUTO IMAGE BINARIZATION

FIELD

Various embodiments relate to image processing, and more particularly to image binarization.

BACKGROUND

Image binarization refers to the process of converting an image represented by pixel values which may assume multiple levels to pixel values which can be one of two values, e.g., a first value corresponding to foreground and a second value corresponding to background. Image binarization can be used to convert a grayscale or a color image to a black and white image. Frequently, binarization is used as the pre-processing step of document image processing. For example, barcodes are typically captured as grayscale or color images that may require binarization as a first step before processing to decode the barcode to ascertain its value. Similarly, optical character recognition (OCR) algorithms may require binarization as a first step.

One approach to using image binarization is to choose a single threshold value and classify each of the pixels of the image with values above this threshold as white and each of the other pixels as black. Such a method works well when the characteristics of the image are consistent across the image. When they are not, because the nature of the contents differs or the density of the characteristics differs or the local lighting differs or there are shadows or defects, etc, then it is better to determine the threshold according to local statistics and adaptively change it for each pixel.

Adaptive image binarization methods may use a sliding window, centered on the pixel to be binarized, and moved along the image from upper left to lower right, for example. At each fixed position of the window, the pixels within the window are evaluated and analyzed to generate a local threshold to use to binarize that particular pixel at the center of the window. Then the window is moved by one pixel and the threshold computed using the contents of just this new window to binarize the pixel at the center of this new window. This continues for all pixels in the image. In this way, every pixel is converted to either black or white according to the statistics of its window and excluding everything outside that window.

The statistics used by known methods for determining thresholds for image binarization are the mean and standard deviation. Related to, and sharing some of the computation with, the standard deviation is the variance. For a window centered at pixel P and containing M×N pixels having graylevel values I[P], the mean m, the variance v, and the standard deviation s are defined by $$m = \frac{1}{MN}\sum\sum I[P]$$

$$v = \frac{1}{MN}\sum\sum_{s=\sqrt{v}}(I[P]-m)^2$$

A well-known binarization method that automatically adapts the threshold value pixel-by-pixel calculates a threshold t for binarizing each pixel P by using a formula due to Sauvola et al. [J. Sauvola, T. Seppanen, S. Haapakoski, and M. Pietikäinen. "Adaptive Document Binarization," *Proc. International Conference on Document Analysis and Recognition*, volume 1, pages 147-152, 1997], $$t = m\left(1 + k\left(\left(\frac{s}{R}\right) - 1\right)\right) = m\left((1-k) + k\left(\frac{s}{R}\right)\right)$$

where m is the mean of the graylevel values in a window centered at the pixel under consideration, s is the standard deviation of the graylevel values of that window, R is the maximum possible value for the standard deviation (e.g., R=128 for an 8-bit grayscale image), and k is a positive number less than one, typically between 0.2 and 0.5. The same window size is used for every pixel in the image.

Performance can be improved by modifying the above equation to subtract the minimum graylevel value found in the whole image from the mean of each window and changing the image-independent constant R to the image-dependent R', where R' is the maximum value of all standard deviations computed for all windows in the image. The resulting formula is originally due to Wolf et al. [Christian Wolf, Jean-Michel Jolion, Francoise Chassaing. "Text Localization, Enhancement and Binarization in Multimedia Documents," *Proc. International Conference on Pattern Recognition*, volume 4, pp. 1037-1040, 2002.] and reformulated herein to better show the relationship to the Sauvola equation, $$t = (m-Z)\left((1-k) + k\left(\frac{s}{R'}\right)\right) + Z$$

where Z is the minimum graylevel value over the whole image and R' is the maximum value of the standard deviations of all windows of the chosen size in the image.

A big problem with the above-described procedure is the inability of a single window size used over the whole image to set a correct threshold for all pixels in the image. An overly-large window size does not allow for local variations in foreground and background intensity to be taken into account and will miss local detail. But a window size that is too small may have all of its pixels, or almost all of its pixels, be foreground pixels, if the features in the foreground include objects as large as, or almost as large as, the window size. The threshold so computed may cause a false classification of foreground pixels into both background and foreground pixels, or even to just background. An effect of this is that the larger features in the foreground end up with holes or other spurious errors in the binarized image. Therefore, a single window size for the whole image is unsatisfactory for many images.

A second problem with the above procedure is the computational complexity of the square root required for computing the standard deviation. That makes it difficult to do binarization on devices with limited computational capability or to do more processing to better the binarization without requiring more resources.

Accordingly, it should be appreciated that there is a need for improved adaptive image binarization methods. It would be beneficial to have available a means for automatically adapting what pixels are included in the computation of the local threshold. It would be further beneficial to keep low the complexity to compute each threshold since that computation has to be done for each and every pixel.

SUMMARY

Various embodiments are directed to improved methods and apparatus for generating bi-level pixel values from a set of input pixel values corresponding to an image. Various described methods and apparatus are well suited for applications with limited computational capability and/or limited available resources to be used for performing image processing. Corresponding to an individual input pixel being processed, a plurality of windows including the pixel are evaluated to determine statistics including a variance for each window. Based upon the determined variances, one of a plurality of binarization threshold generation functions is selected. A binarization threshold for the input pixel being processed is determined using the selected binarization threshold generation function. A bi-level pixel value is generated based on a comparison of the input pixel value being processed to the generated binarization threshold. In various embodiments, the binarization threshold determination functions use non-zero integer powers of one or more variances, and intentionally avoid performing a square root operation, thus limiting computational complexity.

The binarization threshold is determined on a per input pixel basis. When processing the input image, different binarization threshold generation functions may be, and sometimes are, selected and used for different input pixels being processed, e.g., as a function of window variances.

An exemplary method of generating bi-level pixel values from a set of input pixel values corresponding to an image, in accordance with some embodiments, comprises: determining a first variance (v1[P]), said first variance being a variance of input pixel values in a first window of said image, said first window being of a first size and including an input pixel value being processed; determining a second variance (v2[P]), said second variance being a variance of input pixel values in a second window of said image, said second window at least partially overlapping said first window and including said input pixel value being processed in addition to at least some pixel values not included in said first window; and selecting, based on said first variance and said second variance, a binarization threshold generation function from a plurality of binarization threshold generation functions, said plurality of binarization threshold generation functions including at least a first binarization threshold generation function and a second binarization threshold function. The exemplary method further comprises generating a bi-level pixel value from said input pixel value based on a comparison of said input pixel value to a binarization threshold (T) generated by the selected binarization threshold generation function.

An exemplary method of generating bi-level pixel values from a set of input pixel values corresponding to an image, in accordance with some embodiments, includes: determining a pixel value binarization threshold (T) for an input pixel value being processed based on at least a first non-zero integer power value of a first variance and a second non-zero integer power value of the first variance, said first variance being the variance of input pixel values in a first (primary) window, said first window being of a first size and including the input pixel value being processed; and generating a bi-level pixel value from said input pixel value based on a comparison of said input pixel value to said pixel value binarization threshold.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
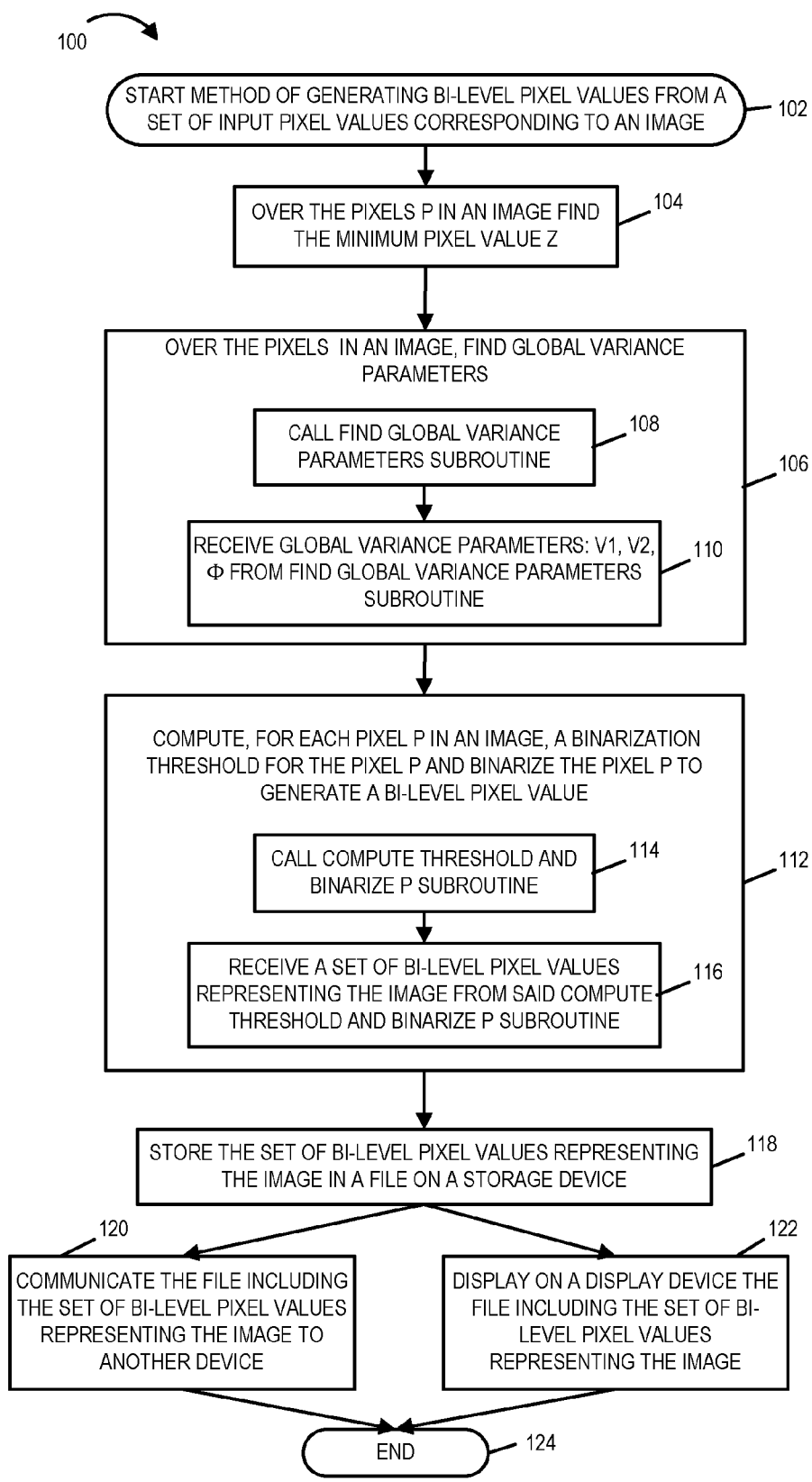
FIG. 1 is a flowchart of an exemplary method of generating bi-level pixel values from a set of input pixel values corresponding to an image in accordance with an exemplary embodiment.

At each pixel whose multi-level value is to be converted to a single black or white value by a threshold operation, prior art used one window centered at the pixel under consideration and two statistical measures, mean and standard deviation, of the pixel values found in that window, to determine the threshold; all windows were of the same size, over the whole image.

Various embodiments of the present invention improve upon that prior art by using windows of more than one size surrounding the pixel under consideration and two statistical measures, mean and variance, instead of mean and standard deviation, computed for each of the windows. The additional window, or windows, provides a means to avoid the problem of a single window not adequately incorporating data from both background and foreground. The change from standard deviation to variance removes the need to compute a square root, an operation to avoid if attempting to speed up a computation and especially of concern if there is more than one window per pixel, and hence more than one standard deviation computation to do.

Various embodiments of the present invention use two windows of different sizes, a primary window and a secondary window. In some such embodiments, the secondary window wholly includes the primary window. In one particular exemplary embodiment, the primary and secondary windows are both centered at the pixel to be binarized. In another particular exemplary embodiment, the primary window is centered at the pixel to be binarized and the secondary window is off-center. A similar approach can be, and in some embodiments is, applied using more than two windows of varying sizes with similar arrangements of the windows, or using two or more windows with other arrangements of the windows.

In various embodiments, the image is processed pixel by pixel. At each pixel, there is a primary window and a secondary window defined. In a pass, first pass, through the image, the variances of the pixel values in the primary and secondary windows are computed and saved. After the entire image has been processed, the maximum value of the variances for the primary windows, e.g., V1[P], is determined and saved and the maximum value of the variances for the secondary windows, e.g., V2[P] is determined and saved. Additionally, the minimum value of all pixels in the image is determined, e.g., in the first pass, and saved, e.g., value Z.

In another pass, e.g., a second pass, through the image, at each pixel in the image, the mean and variance of the pixel values for each of the primary and secondary windows are computed. Next, for the primary window, the computed mean and variance values are combined with the saved maximum primary window variance and the saved minimum image pixel value to compute a first binarization parameter, e.g., t1[P]. Then, for the secondary window, the computed mean and variance values are combined with the saved maximum secondary window variance and the saved minimum image pixel value to compute a second binarization parameter, e.g., t2[P]. A method is next used to determine a threshold for the current pixel under consideration as a function of the first and second binarization parameters, e.g., t1[P], t2[P], and variances of the primary and secondary windows, e.g., v1[P], v2[P], defined for that pixel. In some embodiments, the pixel threshold is a weighted combination of the binarization parameters, e.g., t1[P], t2[P], associated with the two windows, with the weights depending on the variances of the windows, e.g., v1[P], v2[P]. In some embodiments, the pixel threshold, e.g., T, is set to one of: (i) the first binarization parameter, e.g., t1[P] or (ii) a weighted combination of the first and second binarization parameters, t1[P], t2[P], in which both weights are non-zero.

Finally, the pixel is binarized, i.e., converted to a value for white or a value for black, by comparing to the threshold and assigning the output value according to whether the pixel value is above the threshold or not.

Various embodiments of the present invention are an improvement over the prior art since various embodiments of the present invention replace the use of the standard deviation, which would need the computationally intensive square root operation, with the first and second powers of the variance. An exemplary new formula used to compute the first binarization parameter t1 associated with the primary window is $$t1 = (m1 - Z)\left(l_1 + l_2\left(\frac{v1}{V1}\right)^2 - l_3\left(\frac{v1}{V1}\right)\right) + Z$$

where m1 is the mean of the pixel values in the primary window centered at the current pixel P, v1 is the variance of the pixel values in the primary window, V1 is the maximum of the variances of all primary windows in the image, Z is the minimum graylevel value of all pixels in the image, and $l_1$, $l_2$, $l_3$ are positive numbers less than one. Exemplary value for $l_1$ is 0.8575. Exemplary value for $l_2$ is 0.07. Exemplary value for $l_3$ is 0.03. In some embodiments, the determined threshold T for the pixel may be, and sometimes is, set to the value of the first binarization parameter, for the pixel, t1.

In some embodiments, the second binarization parameter, associated with the secondary window, is calculated using the following equation:

$$t2 = (m2 - Z)\left(k_1 + k_2\left(\frac{v2}{V2}\right)\right) + Z$$

where m2 is the mean of the pixel values in the secondary window, v2 is the variance of the pixel values in the secondary window, V2 is the maximum of the variances of all secondary windows in the image, Z is the minimum graylevel value of all pixels in the image, and $k_1$, $k_2$ are positive numbers less than one. Exemplary value for $k_1$ is 0.725. Exemplary value for $k_2$ is 0.275.

To compensate for how the size and thereby contents of the primary and secondary windows differ, it is useful to define a weighting factor 1 as the ratio of the maximum variance V1 over all of the primary windows to the maximum variance V2 over all of the secondary windows; additionally, this factor is not allowed to be less than 1. As an equation:

Φ=max(V1/V2,1)

To binarize each pixel, a threshold is determined and then applied. In some embodiments, that threshold is either the first binarization parameter, e.g., t1, computed from the statistics of the primary window or a threshold computed as a combination of a first binarization parameter, e.g., t1, computed from the statistics of the primary window and a second binarization parameter, e.g., t2, computed from the statistics of the secondary window. The decision of which threshold(s) to use is made by considering the ratio φ of the primary window's variance v1 to the secondary window's variance v2. As an equation:

φ=v1/v2

In some embodiments, if φ is less than one, then the primary window's variance v1 is less than the secondary window's variance v2, and the secondary window's variance should be used in combination with the primary window's variance to compute the threshold for the current pixel. Otherwise, the primary window's variance is sufficiently large to be used alone to set the threshold for the current pixel, and the first binarization parameter is used as the threshold. The intent here is to use the statistics of the secondary window only if the variance of the secondary window is greater than or much greater than the variance of the primary window which would happen, for example, when the primary window contains all foreground pixels but the secondary window contains a mix of foreground pixels and background pixels.

The criterion for deciding whether or not to use the secondary window can be made more strict by comparing the ratio φ to the limit L, where L is set to a value between 1/Φ and 1. In some embodiments, this approach is used. If L is set to the value 1/Φ and the factor Φ is large because the maximum variance over all of the primary windows is much greater than the maximum variance over all of the secondary windows, then secondary window containing the current pixel would not be used unless the ratio φ is much less than 1. This allows for a lower variance in the primary window relative to the secondary window when choosing to use only the primary window's determined first binarization value, e.g., t1, as the threshold for binarizing the current pixel. Thus, the closer L is to 1/Φ, the greater the bias in the decision towards using only the statistics of the primary window.

Additionally, other criteria may apply to decide whether to use just the primary window's determined binarization parameter, e.g., first binarization parameter t1, or just the secondary window's determined binarization parameter, e.g., second binarization parameter t2, or a combination of the two binarization parameters, e.g., t1 combined with t2, as the threshold. An example would be to always use the primary window's determined binarization parameter as the threshold when that parameter is greater than the secondary window's determined binarization parameter.

If the decision is made to use a combination of the primary window's binarization parameter, e.g., first binarization parameter t1, and the secondary window's binarization parameter, e.g., second binarization parameter t2, then a good choice for that combination is the convex combination of the first binarization parameter t1 associated with primary window and the second binarization parameter t2 associated with the secondary window. In some such embodiments, the binarization threshold T is then determined according to the formula $$T=\lambda t1+(1-\lambda)$$ (t2)

where the parameter λ provides the relative weighting applied to the binarization parameters being combined. The parameter λ determines how much of the primary window's binarization value t1 and how much of the secondary window's binarization value t2 each contribute to the combined threshold and is set according to how the computed variance for the pixels in the primary window relates to the computed variance for the pixels in the secondary window.

The scalar λ is set to a value between the ratio φ and the weighted ratio Φ*. The greater the value of λ, the closer is the combined threshold to the primary window's binarization value t1 than to the secondary window's binarization value t2. This causes the local statistics of the primary window to be used as much as possible and the statistics of the secondary window to be used only where the primary window has insufficient variation in which case the secondary window is needed to adjust the combined threshold away from the primary window's binarization parameter t1 value and towards the secondary window's binarization parameter t2 value. Note, however, that the closer the limit L is to the value 1/Φ, then the smaller is the ratio φ, and the scalar λ can be set closer to the weighted ratio Φ*φ to increase the contribution of the statistics of the smaller window in the convex combination thereby preventing the contribution due to the statistics of the secondary window from becoming too great.

Figure 4:
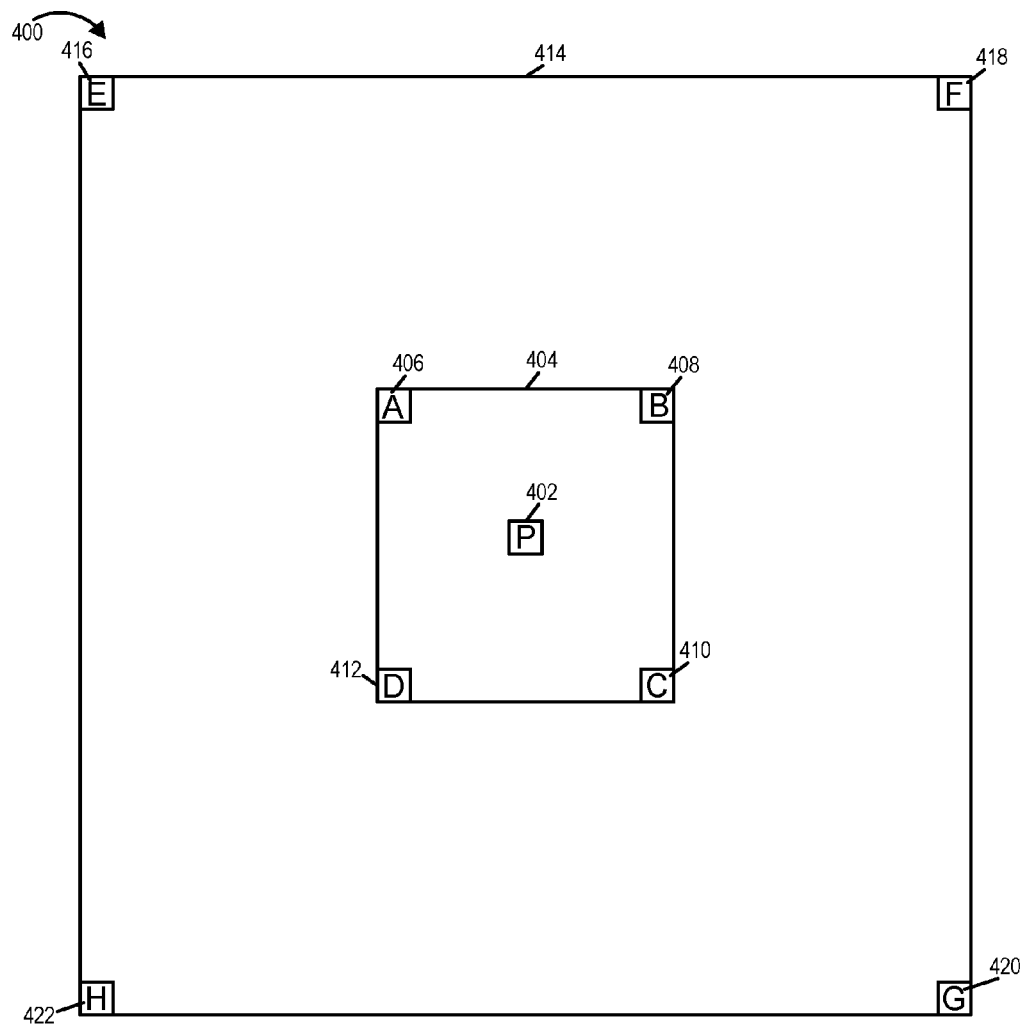
FIG. 4 illustrates the locations of two exemplary windows centered at the pixel P under consideration.

Various embodiments of the invention do not restrict the relative positioning of the primary window and the secondary window except that they should both contain the pixel to be binarized. Furthermore, there can be one or more secondary windows, e.g., a second window, a third window, etc., whose statistics can be used singly or in combination to compute one or more secondary binarization values, e.g., second binarization parameter t2, third binarization parameter t3, etc., to be combined with the primary binarization value, e.g., first binarization parameter t1, to yield the binarization threshold T to use to binarize the current pixel. What is expected to be the most often used case is that of a single secondary window overlaying the primary window such that both windows are centered at the current pixel. FIG. 4 shows this arrangement in drawing 400, where pixel P 402 is at the center of the primary window 404 with vertices ABCD (406, 408, 410, 412), respectively, and at the center of the secondary window 414 with vertices EFGH (416, 418, 420, 422), respectively.

For some images with characteristics such as non-uniform illumination or shadows, for example, inadequate binarization results when using the secondary window that shares a center pixel with the primary window. In these cases, improved binarization results are possible by using a secondary window that does not share the same center as the primary window but is instead positioned off-center from the primary window.

Figure 5:
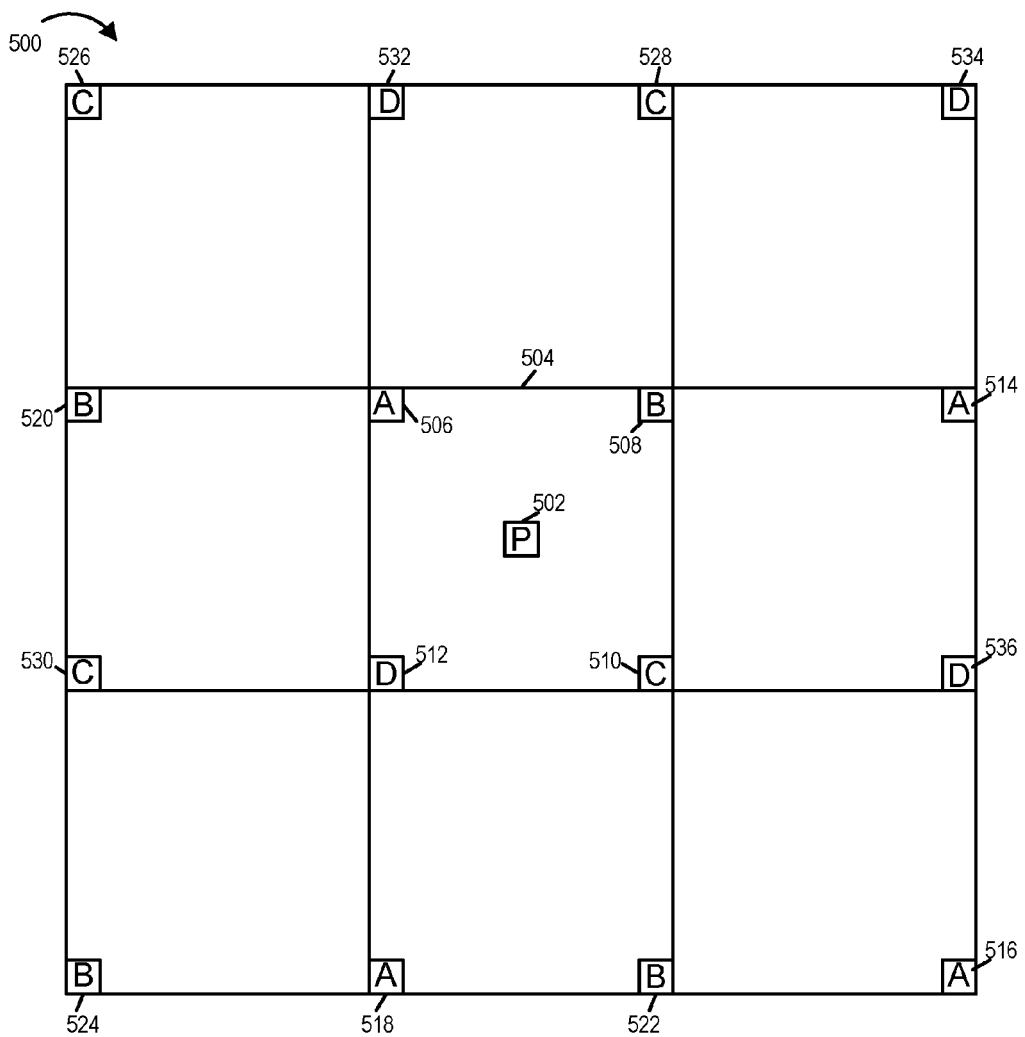
FIG. 5 illustrates the location of an exemplary window centered at pixel P and the locations of exemplary multiple off-center windows relative to the pixel P under consideration.

An exemplary embodiment defines the secondary window to be one of the four windows that share their corner pixels with the pixels of the primary window. Drawing 500 of FIG. 5 shows the possibilities. Pixel P 502 is at the center of the primary window 504 with vertices ABCD (506, 508, 510, 512), respectively. One possible secondary window has vertices AAAA (506, 514, 516, 518) and shares its upper left corner with the primary window. A second possible secondary window has vertices BBBB (520, 508, 522, 524) and shares its upper right corner with the primary window. A third possible secondary window has vertices CCCC (526, 528, 510, 530) and shares its lower right corner with the primary window. A fourth possible secondary window has vertices DDDD (532, 534, 536, 512), respectively, and shares its lower left corner with the primary window.

Figure 6:
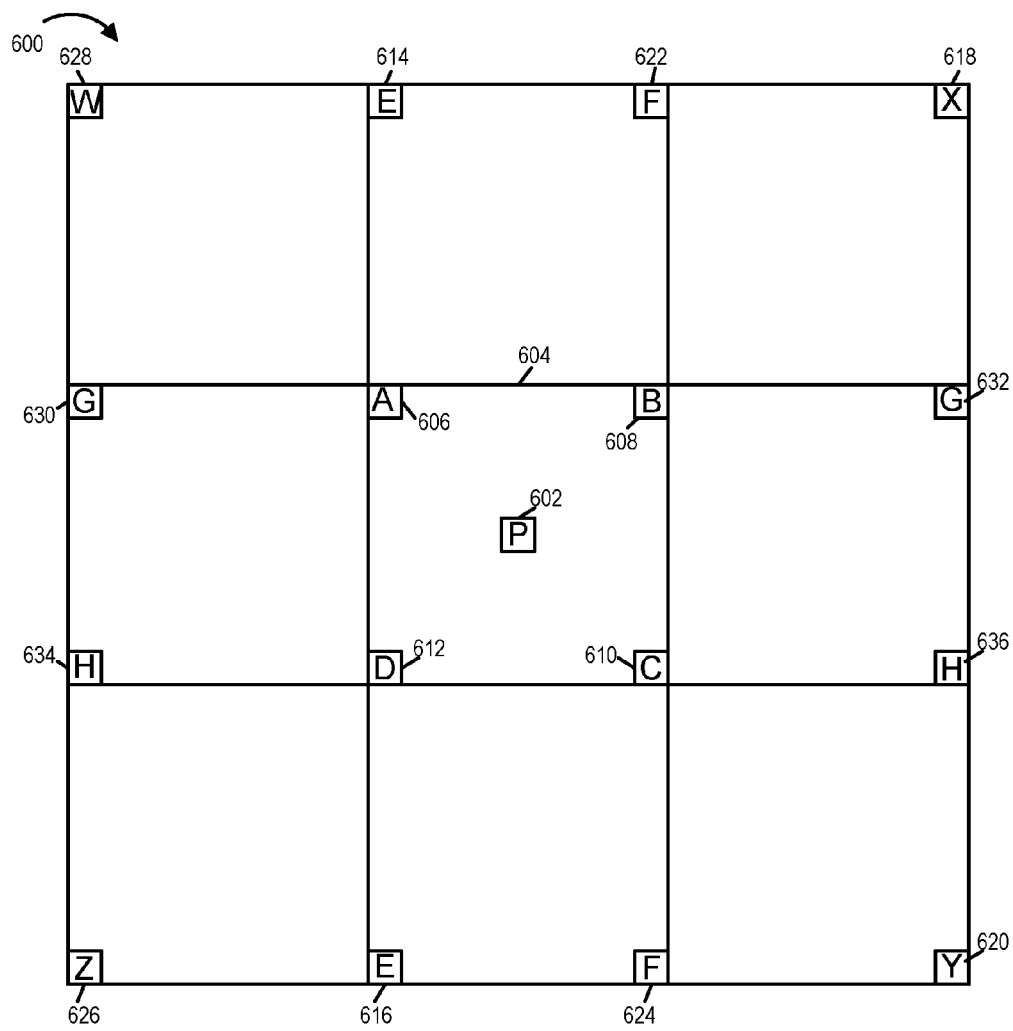
FIG. 6 illustrates the of an exemplary window centered at pixel P and the locations of exemplary multiple off-center windows relative to the pixel P under consideration.

Another exemplary embodiment defines the secondary window to be one of the four windows that share some of their side pixels with the pixels of the primary window. Drawing 600 of FIG. 6 shows the possibilities. Pixel P 602 is at the center of the primary window 604 with vertices ABCD (606, 608, 610, 612), respectively. One possible secondary window has vertices EEXY (614, 616, 618, 620) and shares the middle of its left side with the primary window. A second possible secondary window has vertices FFZW (622, 624, 626, 628) and shares the middle of its right side with the primary window. A third possible secondary window has vertices GGYZ (630, 632, 620, 626) and shares the middle of its top side with the primary window. A fourth possible secondary window has vertices HHWX (634, 636, 626, 618) and shares the middle of its bottom side with the primary window.

In some embodiments, for each pixel being processed, the variance for each of the four candidate secondary windows is computed. One of the four candidate windows is chosen based on the outcome of a comparison amongst the variances and that window is defined as the secondary window for that particular pixel. A good method for choosing from amongst the four windows is to choose the window with the smallest variance.

FIG. 1 is a flowchart 100 of an exemplary method of generating bi-level pixel values from a set of input pixel values corresponding to an image in accordance with various embodiments. The exemplary method of FIG. 1 may be implemented by the computer system 900 of FIG. 9. Operation of the exemplary method starts in step 102, e.g., in which an input image to be processed is received, and proceeds to step 104.

In step 104, the value of the each input pixel P of the input image being processed is read and the minimal pixel value Z in the image is found and stored. Operation proceeds from step 104 to step 106

In step 106, a set of global variance parameters is found over the input pixels in the image. Step 106 includes step 108 and step 110. In step 108 a call is made to find global variance parameters subroutine. Operation proceeds from step 108 to step 110. In step 110, the global variance parameters: V1, V2, Φ, are received from find global variance parameters subroutine. Operation proceeds from step 106 to step 112.

In step 112, for each pixel P in the image, a binarization threshold T is computed and the pixel P is binarized to generate a bi-level value. Step 112 includes step 114 and step 116. In step 114 a call is made to compute threshold and binarize subroutine. Operation proceeds from step 114 to step 116. In step 116, a set of bi-level pixel values representing the image are received from the compute threshold and binarize P subroutine. Operation proceeds from step 112 to step 118.

In step 118 a set of bi-level pixel values representing the image are stored in a file on a storage device. Operation proceeds from step 118 to steps 120 and 122. In step 120 the file including the set of bi-level pixel values representing the image is communicated to another device. In step 122, the file including the set of bi-level pixel values representing the image are displayed on a display device. Operation proceeds from steps 120 and 122 to end step 124.

Figure 2:
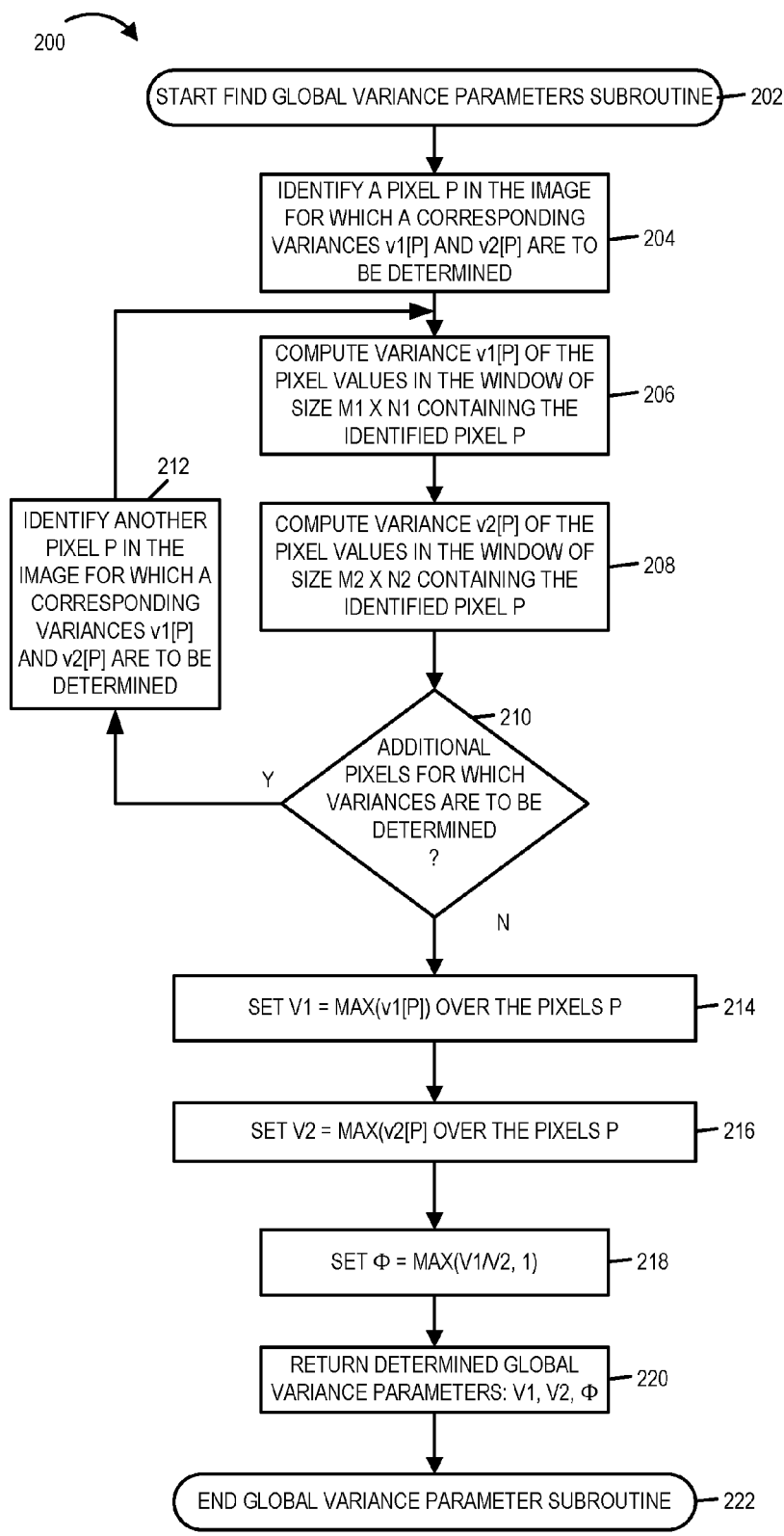
FIG. 2 is a flowchart of an exemplary subroutine used to find global variance parameters corresponding to an image, in accordance with an exemplary embodiment.

FIG. 2 is a flowchart 200 of an exemplary find global variance parameters subroutine in accordance with an exemplary embodiment. The exemplary method of FIG. 2 may be implemented by the computer system 900 of FIG. 9. The subroutine of flowchart 200 is, e.g., the subroutine called in step 108 of flowchart 100 of FIG. 1. Operation starts in step 202, when the subroutine is called, and proceeds to step 204.

In step 204, the subroutine identifies a pixel P in the image being processed for which corresponding variances v1[P] and v2[P] are to be determined, e.g., identifies a first pixel in the image to be processed. Operation proceeds from step 204 to step 206.

In step 206, the subroutine computes variance v1[P] of the pixel values in the window of size M1×N1 containing the identified pixel P. Thus variance v1[P] is computed for a first window corresponding to pixel P, e.g., the primary window for pixel P which includes pixel P. Operation proceeds from step 206 to step 208.

In step 208, the subroutine computes variance v2[P] of the pixel values of the pixel values in the window of size M2×N2 containing the identified pixel P. Thus variance v2[P] is computed for a second window corresponding to pixel P, e.g., the secondary window for pixel P which includes pixel P. Operation proceeds from step 208 to step 210.

While the M1×N1 window and M2×N2 window sizes may be used within the image with the pixel of interest which is being binarized located at the center of the windows, at the edges of the image there may be insufficient pixels on the left, right, top and/or bottom potions of the window or windows given that the image does not extend sufficiently in one or more directions for there to be pixel values to fully occupy the window. To make up for such border region cases, missing values may be padded, e.g., by repeating one or more pixel values that are available in the window to serve in the place of the missing pixel values. Alternatively the window may be restricted to pixel values which are available. In such a case the window size used for border pixels may be reduced and the pixel value being binarized may not be located in the center of the window. For example, if a right edge pixel is being binarized, the windows used for binarization may be reduced in size to exclude the unavailable pixels with the pixel being binarized being located in the right most column of pixel values used for the binarization windows. In such a case, the number of pixel values to the left of the pixel value being binarized will be the same as usual, assuming the top and bottom portions of the window do not extend beyond the edge of the image, but with no pixel values being used to the right of the pixel value being binarized since such values are not available. As should be appreciated processing of edge pixel values may be viewed as a special case which can be handled in any number of ways, e.g., through padding or via dynamically varying the primary and secondary window sizes based on the location of a pixel being binarized within the image. It should also be appreciated that while rectangular windows are used in many embodiments, windows of other shapes may be, and in some embodiments are, used as part of the binarization process.

In step 210 the subroutine determines if there are additional pixels for which corresponding variances are to be determined. If there are additional pixels in the input image for which a pair of variances have not been computed, then operation proceeds from step 210 to step 212 in which the subroutine identifies another pixel P in the image for which a corresponding set of variances v1[P] and v2[P] are to be determined Operation proceeds from step 212 to the input of step 206. Returning to step 210, in 210 if the subroutine determines that each of the pixels in the input image have been processed, e.g., a pair of variances has been computed corresponding to each of the pixel in the image, then operation proceeds from step 210 to step 214.

In step 214, the subroutine sets variable V1=maximum (v1[P] over the pixels P). Thus V1 represents the maximum variance for a first window in the image. Operation proceeds from step 214 to step 216. In step 216, the subroutine sets variable V2=maximum (v2[P] over the pixels P). Thus V2 represents the maximum variance for a second window in the image. Operation proceeds from step 216 to step 218.

In step 218 the subroutine sets the variable Φ=maximum (V1/V2, 1). The variable Φ is a weighting factor used to compensate for how the size and thereby contents of the primary and secondary windows differ. In addition, this weighting factor is not allowed to be less than 1. Operation proceeds from step 218 to step 220. In step 220, the subroutine returns the global variance parameter set: maximum determined variance for a first window in the image being processed V1, maximum determined variance for a second window in the image being processed V2, and weighting factor Φ. Operation proceeds from step 220 to end step 222.

Figure 3:
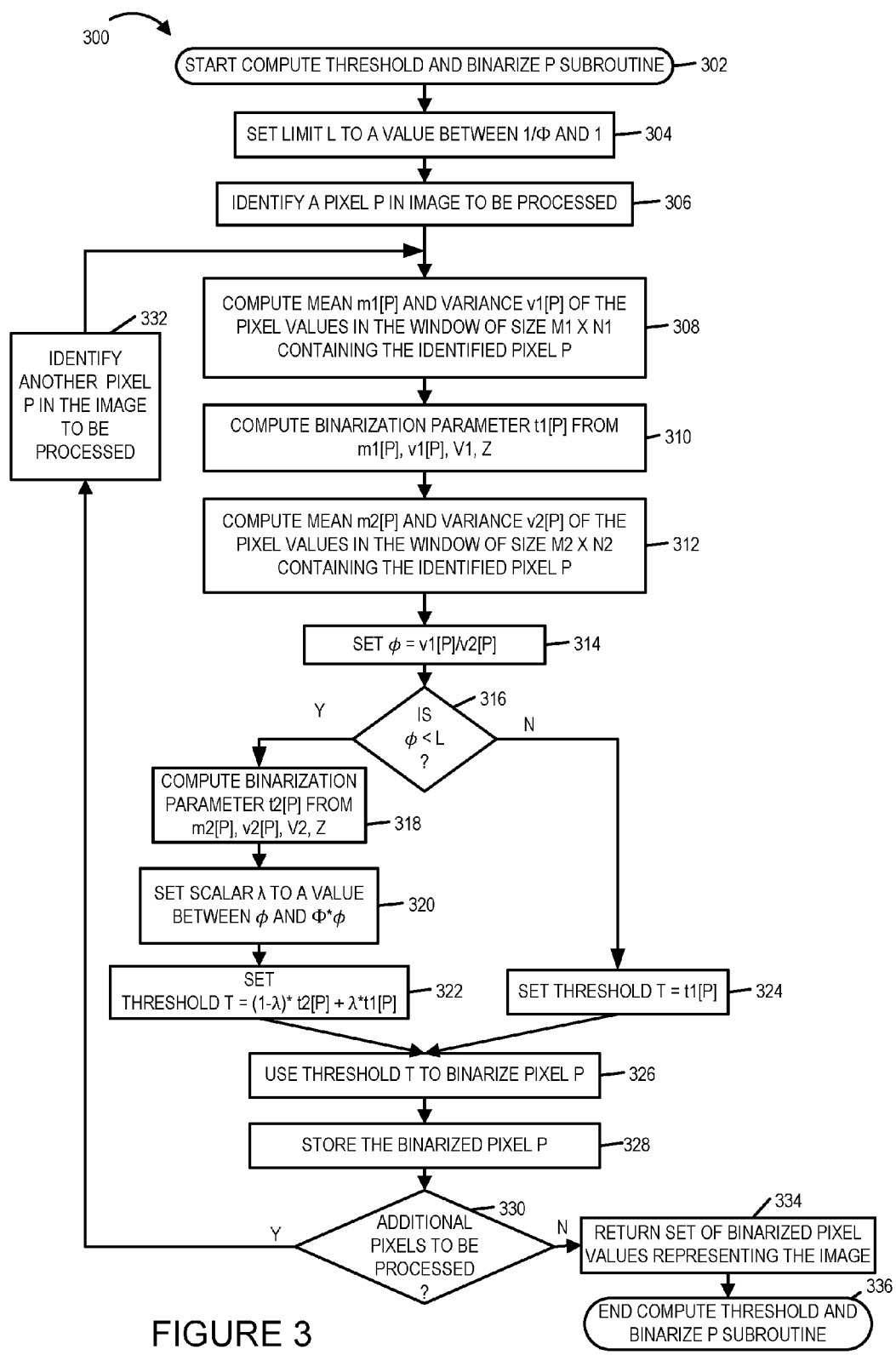
FIG. 3 is a flowchart of an exemplary subroutine used to compute binarization thresholds and binarize pixels, in accordance with an exemplary embodiment.

FIG. 3 is a flowchart 300 of an exemplary compute threshold and binarize P subroutine in accordance with an exemplary embodiment. The exemplary method of FIG. 3 may be implemented by the computer system 900 of FIG. 9. The subroutine of flowchart 300 is, e.g., the subroutine called in step 114 of flowchart 100 of FIG. 1. Operation starts in step 302, when the subroutine is called, and proceeds to step 304.

In step 304, the subroutine identifies limit L to be a value between 1/Φ and 1. Operation proceeds from step 304 to step 306.

In step 306, the subroutine identifies a pixel P in the image being processed, e.g., identifies a first pixel in the image to be processed. Operation proceeds from step 306 to step 308. In step 308 the subroutine computes a mean m1[P] and variance v1[P] of the pixel values in the window of size M1×N1 containing the identified pixel P. Thus mean m1[P] and variance v1[P] are computed for a first window corresponding to pixel P, e.g., the primary window for pixel P which includes pixel P. Operation proceeds from step 308 to step 310.

In step 310 the subroutine computes a first binarization parameter t1[P] from m1[P], v1[P], V1, and Z. In some embodiments, the following equation is used to compute the first binarization parameter t1[P]:

$$t1[P] = (m1[P] - Z)\left(l_1 + l_2\left(\frac{v1[P]}{V1}\right)^2 - l_3\left(\frac{v1[P]}{V1}\right)\right) + Z$$

where m1[P] is the mean of the pixel values in the primary window for the current pixel P, e.g., the primary window centered at the current pixel P, v1 is the variance of the pixel values in the primary window for the current pixel P, V1 is the maximum of the variances of all primary windows in the image, Z is the minimum graylevel value of all pixels in the image, and $l_1, l_2, l_3$ are positive numbers less than one. Exemplary value for $l_1$ is 0.8575. Exemplary value for $l_2$ is 0.07. Exemplary value for $l_3$ is 0.03.

Operation proceeds from step 310 to step 312. In step 312 the subroutine computes a mean m2[P] and variance v2[P] of the pixel values in the window of size M2×N2 containing the identified pixel P. Thus mean m2[P] and variance v2[P] are computed for a second window corresponding to pixel P, e.g., the secondary window for pixel P which includes pixel P. Operation proceeds from step 312 to step 314.

In step 314 the subroutine sets variable φ=v1[P]/v2[P]. Operation proceeds from step 314 to step 316. In step 316 the subroutine determines if the value of variable φ is less than the value of variable L. If φ is less than L, then operation proceeds from step 316 to step 318; otherwise operation proceeds from step 316 to step 324. In step 324, the subroutine sets the binarization threshold T=the value of the first binarization parameter t1[P].

Returning to step 318, in step 318 the subroutine computes a second binarization parameter t2[P] from m2[P], v2[P], V2, and Z. In some embodiments the second binarization parameter is computed in accordance with the following equation:

$$t2[P] = (m2[P] - Z)\left(k_1 + k_2\left(\frac{v2[P]}{V2}\right)\right) + Z$$

where m2[P] is the mean of the pixel values in the secondary window for the current pixel P, v2[P] is the variance of the pixel values in the secondary window for the current pixel P, V2 is the maximum of the variances of all secondary windows in the image, Z is the minimum graylevel value of all pixels in the image, and $k_1, k_2$ are positive numbers less than one. Exemplary value for $k_1$ is 0.725. Exemplary value for $k_2$ is 0.275.

Operation proceeds from step 318 to step 320, in which the subroutine sets the scalar λ to a value between φ and Φ*φ. Operation proceeds from step 320 to step 322. In step 322 the subroutine sets the binarization threshold T=(1−λ)*t2[P]+ λ*t1[P].

Operation proceeds from step 322 or step 324 to step 326, in which the subroutine uses the determined threshold T to binarize pixel P. Operation proceeds from step 326 to step 328. In step 328 the subroutine stores the binarized pixel P. Operation proceeds from step 328 to step 330. In step 330, the subroutine checks to see if there are additional pixels to be processed. If there are additional pixels in the image to be processed, e.g., for which a binarization threshold is to be determined and to be binarized using the determined binarization threshold, then operation proceeds from step 330 to step 332; otherwise, operation proceeds from step 330 to step 334.

Returning to step 332, in step 332 the subroutine identifies another pixel P in the image to be processed. Operation proceeds from step 332, to step 308.

Returning to step 334, in step 334 the subroutine returns a set of binarized pixel values representing the image. For example, the returned set of binarized pixel values representing the image is received in step 116 of flowchart 100 of FIG. 1, e.g., by the main program executing the flowchart of FIG. 1. Operation proceeds from step 334 to subroutine end step 336.

Figures 7, 7A:
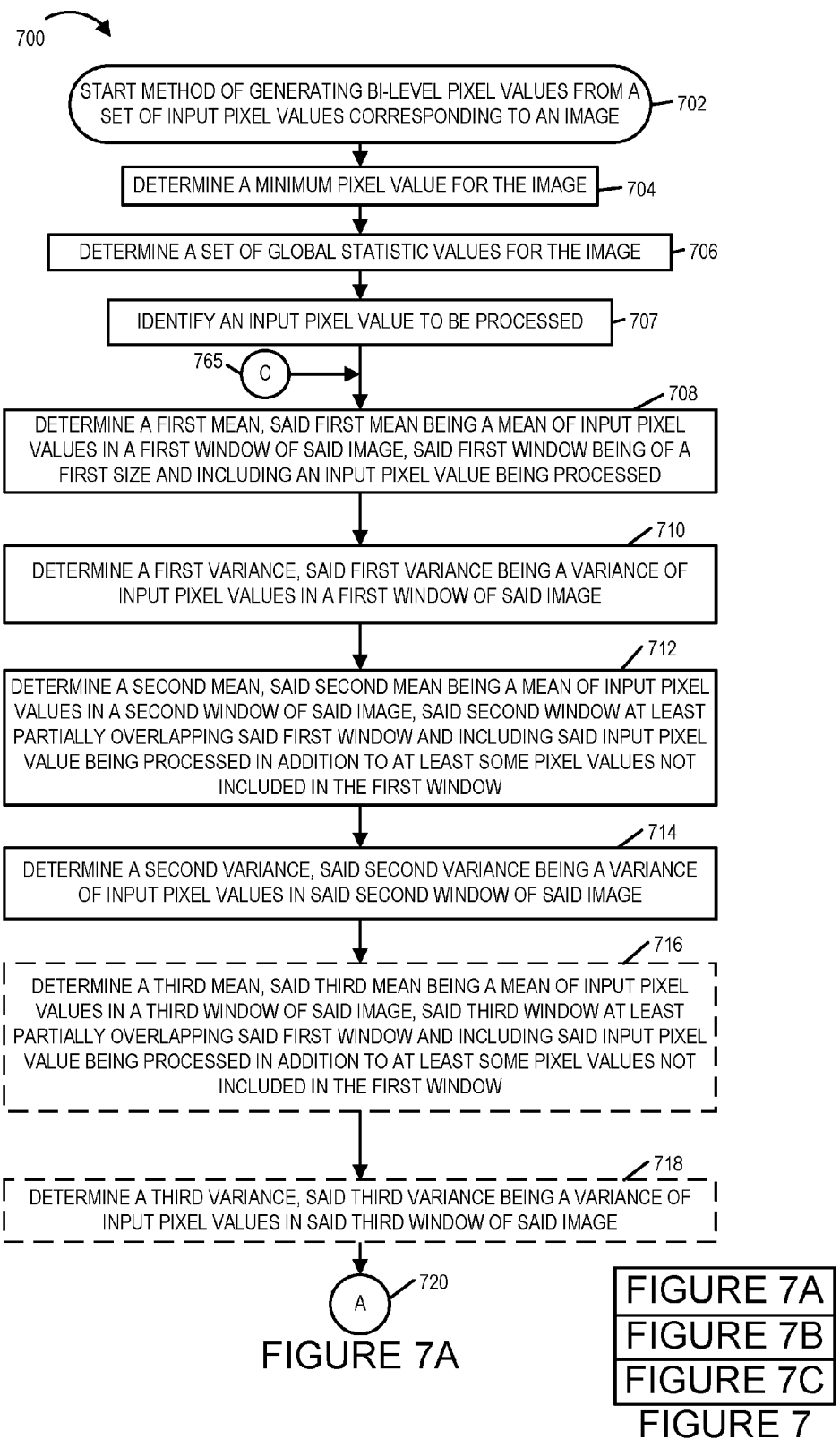
FIG. 7A is a first part of a flowchart of an exemplary method of generating bi-level pixel values from a set of input pixel values corresponding to an image in accordance with various exemplary embodiments.
Figure 7B:
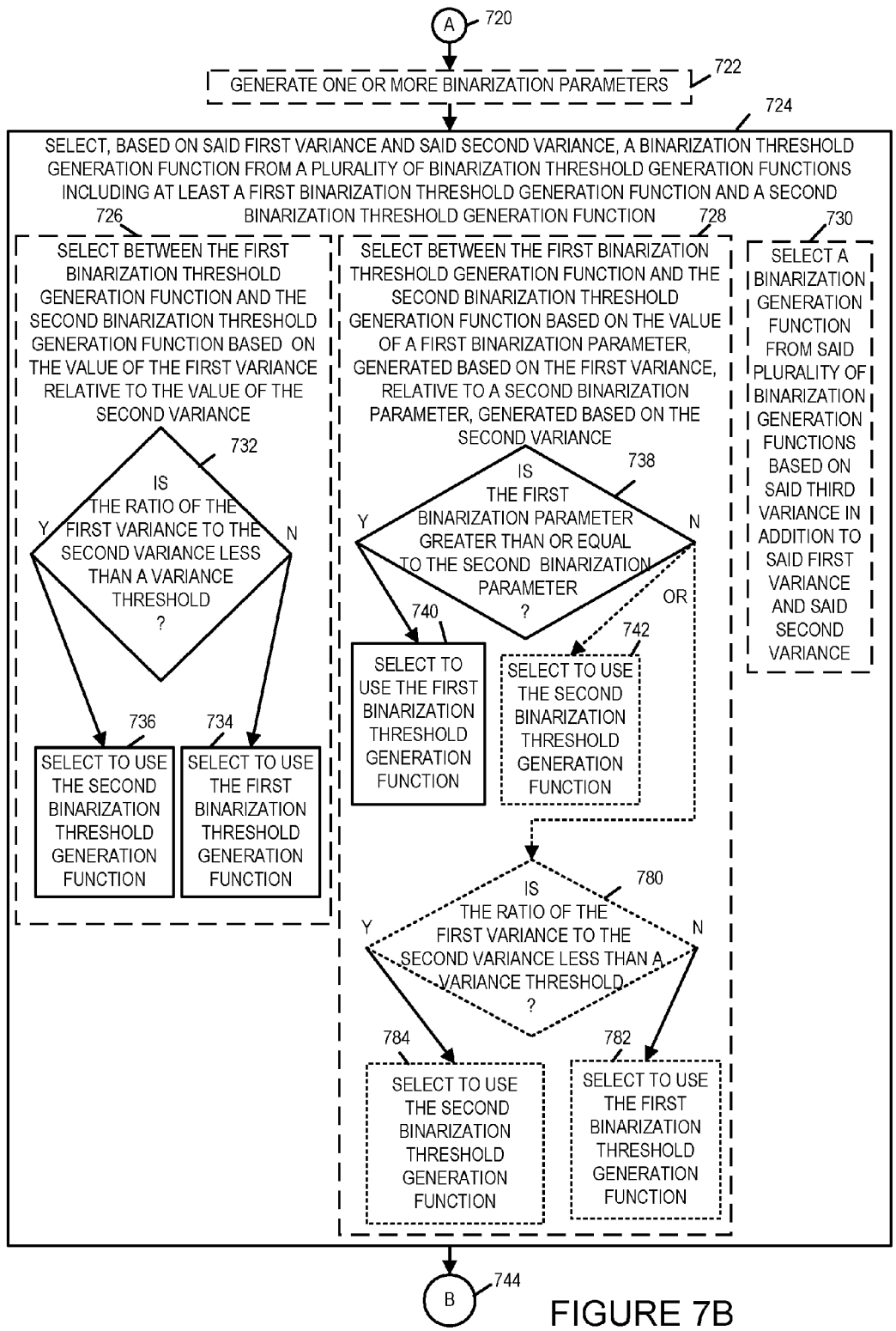
FIG. 7B is a second part of a flowchart of an exemplary method of generating bi-level pixel values from a set of input pixel values corresponding to an image in accordance with various exemplary embodiments.
Figure 7C:
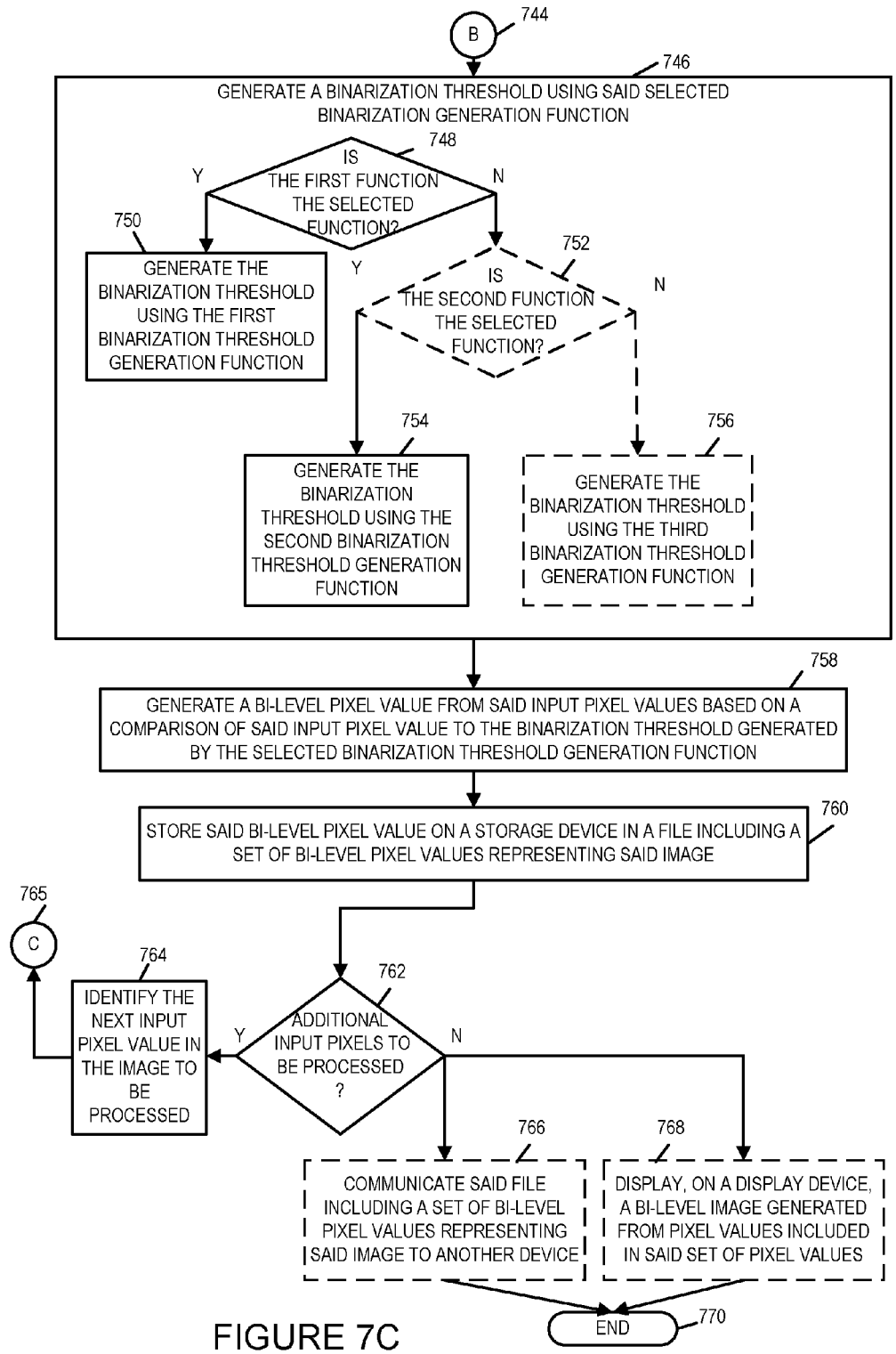
FIG. 7C is a third part of a flowchart of an exemplary method of generating bi-level pixel values from a set of input pixel values corresponding to an image in accordance with various exemplary embodiments.

FIG. 7, comprising the combination of FIG. 7A, FIG. 7B and FIG. 7C, is a flowchart 700 of an exemplary method of generating bi-level pixel values from a set of input pixel values corresponding to an image in accordance with various exemplary embodiments. The exemplary method of FIG. 7 may be implemented by the computer system 900 of FIG. 9. Operation of the exemplary method starts in step 702 and proceeds to step 704. In step 704 a minimum pixel value, e.g., Z, for the image is determined. In some embodiments, in step 704 a first pass through the set of input pixel values corresponding to the image is performed and the minimal value is identified. Operation proceeds from step 704 to step 706.

In step 706, a set of global statistic values for the image are determined In some embodiments, in which two windows are evaluated for each pixel P in the image, the set of global statistic values include: V1, V2, and Φ, where V1 is a maximum variance for a first window in the image, where V2 is a maximum variance for a second window in the image, and where Φ is a weighting factor. In some such embodiments, weighting factor Φ=maximum (V1/V2, 1). In some other embodiments, in which three windows are evaluated for each pixel P in the image, the set of global statistic values include: V1, V2, and V3, where V1 is a maximum variance for a first window in the image, where V2 is a maximum variance for a second window in the image, and where V3 is a maximum variance for a third window in the image. Thus, for each input pixel in the set of input pixels corresponding to the image, a first window is determined and a corresponding first window variance is determined, and then a maximum first window variance for the entire image is determined. Similarly, for each input pixel in the set of input pixels corresponding to the image, a second window is determined and a corresponding second window variance is determined, and then a maximum second window variance for the entire image is determined. Similarly, for embodiments including three windows per input pixel, for each input pixel in the set of input pixels corresponding to the image, a third window is determined and a corresponding third window variance is determined, and then a maximum third window variance for the entire image is determined.

Operation proceeds from step 706 to step 707, in which an input pixel value in the image to be processed is identified. Operation proceeds from step 707 to step 708.

In step 708 a first mean, e.g., m1[P], is determined, said first mean being a mean of input pixel values in a first window of said image, said first window being of a first size and including an input pixel, e.g., pixel P, being processed. Operation proceeds from step 708 to step 710.

In step 710 a first variance, e.g., v1[P], is determined said first variance being a variance of input pixel values in said first window of said image. Operation proceeds from step 710 to step 712.

In step 712, a second mean, e.g., m2[P], is determined said second mean being a mean of input pixel values in a second window of said image, said second window at least partially overlapping said first window and including said input pixel, e.g., pixel P, being processed in addition to at least some pixel values not included in said first window. Operation proceeds from step 712 to step 714.

In step 714 a second variance, e.g., v2[P], is determined said second variance being a variance of input pixel values in said second window of said image. Operation proceeds from step 712 to step 714.

In some embodiments, said second window is larger than said first window. In some such embodiments, said first window is fully within said second window.

In some embodiments, said first window partially overlaps said second window. In some such embodiments, said first and second windows are the same size.

In some embodiments, the first and second windows are rectangular windows including different numbers of rows of pixels, different numbers of column of pixels, or different numbers of both rows and columns of pixels.

Operation proceeds from step 714 to one of steps 716, 722, and step 724, depending upon the particular embodiment. In some embodiments, three windows are used corresponding to each pixel P, steps 722 and 724 are included, and operation proceeds from step 714 to step 716.

In step 716, a third mean, e.g., m3[P], is determined said third mean being a mean of input pixel values in a third window of said image, said third window at least partially overlapping said first window and including said input pixel, e.g., pixel P, being processed in addition to at least some pixel values not included in said first window. Operation proceeds from step 716 to step 718.

In step 718 a third variance, e.g., v3[P], is determined said third variance being a variance of input pixel values in said third window of said image. Operation proceeds from step 718, via connecting node A 720, to one of steps 722 and 724, depending upon the particular embodiment.

In some embodiments, one or more binarization parameters are computed before the selection step 724, and step 722 is performed. In some other embodiments, step 722 is bypassed and one or more binarization parameters are computed in step 724. In some embodiments, some binarization parameters are computed in step 722 and other binarization parameters are computed in step 724.

In some embodiments, a first binarization parameter, e.g., t1[P], is computed in step 722. In some such embodiments, the following equation is used to compute the first binarization parameter t1[P]:

$$t1[P] = (m1[P] - Z)\left(l_1 + l_2\left(\frac{v1[P]}{V1}\right)^2 - l_3\left(\frac{v1[P]}{V1}\right)\right) + Z$$

where m1[P] is the mean of the pixel values in the first, e.g., primary, window for the current pixel P, e.g., the primary window centered at the current pixel P, v1[P] is the variance of the pixel values in the first window for the current pixel P, V1 is the maximum of the variances of all first windows in the image, Z is the minimum value of all pixels in the image, and $l_1, l_2, l_3$ are positive numbers less than one. Exemplary value for $l_1$ is 0.8575. Exemplary value for $l_2$ is 0.07. Exemplary value for $l_3$ is 0.03.

In some embodiments, a second binarization parameter, e.g., t2[P] is further computed. In some embodiments, the second binarization parameter, associated with the second window, is calculated using the following equation:

$$t2[P] = (m2[P] - Z)\left(k_1 + k_2\left(\frac{v2[P]}{V2}\right)\right) + Z$$

where m2[P] is the mean of the pixel values in the second window for the current pixel P, v2[P] is the variance of the pixel values in the second window for the current pixel P, V2 is the maximum of the variances of all secondary windows in the image, Z is the minimum value of all pixels in the image, and $k_1, k_2$ are positive numbers less than one. Exemplary value for $k_1$ is 0.725. Exemplary value for $k_2$ is 0.275.

In some embodiments, a third binarization parameter, e.g., t3[P], is further computed in step 722. In some such embodiments, the third binarization parameter is a function of m3[P], v3[P], V3, and Z.

Operation proceeds from step 722 to step 724. In step 724, a binarization threshold generation function is selected, based on said first and second variance, e.g., based on v1[P] and v2[P], from a plurality of binarization threshold generation functions, said plurality of binarization threshold generation functions including at least a first binarization threshold generation function and a second binarization threshold generation function.

In some embodiments, said first binarization threshold generation function generates said binarization threshold based on pixel values in said first window and said second binarization threshold generation function generates said binarization threshold based on pixel values in the second window. In some such embodiments, said second binarization threshold generation function generates said binarization threshold based on pixel values in said first window.

In some embodiments, step 724 includes one of steps 726, 728 and 730. In step 726, a selection is performed between the first threshold binarization generation function and the second binarization threshold generation function based on the value of the first variance, e.g., v1[P] relative to the value of the second variance, e.g., v2[P].

In various embodiments, the first binarization threshold generation function generates said binarization threshold from pixel values included in said first window without use of pixel values from portions of said second window which are not included in said first window, and the second binarization threshold generation function generates said binarization threshold from a weighted sum of a first binarization parameter, e.g., t1[P] generated based on the first variance, and a second binarization parameter, e.g., t2[P], generated based on the second variance. In some such embodiments, the second binarization threshold generation function generates said binarization threshold based on a first non-zero integer power value of the second variance. In some such embodiments, said second binarization threshold generation function generates said binarization threshold based on at least a first non-zero integer power value of the first variance and a second non-zero integer power value of the first variance, e.g. based on v1[P] and v1²[P]. In various embodiments, the second binarization threshold generation function does not use a fractional power of the first or second variance to determine the second binarization threshold.

Step 726 includes steps 732, 734 and 736. In step 732 the ratio of the first variance to the second variance, e.g. $\phi = v1[P]/v2[P]$, is compared to a variance threshold, e.g., L. In some embodiments, the variance threshold L is set to a value between $1/\Phi$ and 1. In some embodiments, the variance threshold L=1, and the second binarization threshold generation function is selected when the first variance v1[P] is less than the second variance v2[P].

If the ratio of the first variance to the second variance is not less than the variance threshold, then operation proceeds from step 732 to step 734, where the selection is to use the first binarization threshold generation function. In various embodiments, the first binarization threshold generation function generates said binarization threshold based on at least a first non-zero integer power of the first variance and a second non-zero integer power of the first variance, e.g., based on v1[P] and v1$^2$[P]. In some such embodiments, the first binarization threshold generation function does not use a fractional power of said first variance to generate said binarization threshold, e.g., a square root operation is not performed to generate a standard deviation from a variance.

In some embodiments, the first binarization threshold generation function is a function of: m1[P], v1[P], V1, and Z. In one such embodiments, the first binarization function is such that binarization threshold T=first binarization parameter t1[P], where $$t1[P] = (m1[P] - Z)\left(l_1 + l_2\left(\frac{v1[P]}{V1}\right)^2 - l_3\left(\frac{v1[P]}{V1}\right)\right) + Z$$

However, if the ratio of the first variance to the second variance is less than the variance threshold, then operation proceeds from step 732 to step 736, where the selection is to use the second binarization threshold generation function. In some such embodiments, the second binarization threshold generation function is a function of m1[P], v1[P], V1, m2[P], v2[P], V2 and Z. In some such embodiments, the scalar A is set to a value between $\phi$ and $\Phi*\phi$. In some embodiments, the second binarization generation function is such that it sets binarization threshold T=$(1-\lambda)*t2[P]+A*t1[P]$, where scalar A is a value between $\phi$ and $\Phi*\phi$, where $$t1[P] = (m1[P] - Z)\left(l_1 + l_2\left(\frac{v1[P]}{V1}\right)^2 - l_3\left(\frac{v1[P]}{V1}\right)\right) + Z$$

and where, $t2[P] = (m2[P] - Z)\left(k_1 + k_2\left(\frac{v2[P]}{V2}\right)\right) + Z$.

Returning to step 728, in step 728 a selection is performed between the first binarization threshold generation function and the second binarization generation function based on the value of a first binarization parameter, e.g., t1[P], generated based on the value of the first variance, e.g., v1[P], relative to a second binarization parameter, e.g. t2[P], generated based on the second variance, e.g., v2[P]. Step 728 includes step 738 and step 740. In some embodiments, step 728 further includes step 742. In some other embodiments, step 738 further includes step 780, step 782 and step 784. In step 738 the first binarization parameter, e.g. t1[P] is compared to the second binarization parameter t2[P]. If it is determined that the first binarization parameter is greater than or equal to the second binarization parameter, then operation proceeds from step 738 to step 740 in which the selection is to use the first binarization threshold generation function. In some such embodiments, the first threshold generation function is a function of m1[P], v1[P], V1, and Z. In one such embodiment, the binarization threshold T=value of the first binarization parameter t1[P], when step 740 is performed.

Returning to step 738, in some embodiments, if in step 738 it is determined that the first binarization parameter is not greater than or equal to the second binarization parameter, i.e., the first binarization parameter is less than the second binarization parameter, then operation proceeds from step 738 to step 742, in which the selection is to use the second binarization threshold generation function. In some such embodiments, the second threshold generation function is a function of m2[P], v2[P], V2, and Z. In one such embodiment, the binarization threshold T=value of the second binarization parameter t2[P], when step 742 is performed.

Returning to step 738, in some other embodiments, if in step 738 it is determined that the first binarization parameter is not greater than or equal to the second binarization parameter, i.e., the first binarization parameter is less than the second binarization parameter, then operation proceeds from step 738 to step 780.

In step 780 the ratio of the first variance to the second variance, e.g. $\phi = v1[P]/v2[P]$, is compared to a variance threshold, e.g., L. In some embodiments, the variance threshold L is set to a value between $1/\Phi$ and 1. In some embodiments, the variance threshold L=1, and the second binarization threshold generation function is selected when the first variance v1[P] is less than the second variance v2[P].

If the ratio of the first variance to the second variance is not less than the variance threshold, then operation proceeds from step 780 to step 782, where the selection is to use the first binarization threshold generation function. In various embodiments, the first binarization threshold generation function generates said binarization threshold based on at least a first non-zero integer power of the first variance and a second non-zero integer power of the first variance, e.g., based on v1[P] and v1$^2$[P]. In some such embodiments, the first binarization threshold generation function does not use a fractional power of said first variance to generate said binarization threshold, e.g., a square root operation is not performed to generate a standard deviation from a variance.

In some embodiments, the first binarization threshold generation function is a function of: m1[P], v1[P], V1, and Z. In one such embodiments, the first binarization function is such that binarization threshold T=first binarization parameter t1[P], where $$t1[P] = (m1[P] - Z)\left(l_1 + l_2\left(\frac{v1[P]}{V1}\right)^2 - l_3\left(\frac{v1[P]}{V1}\right)\right) + Z$$

However, if the ratio of the first variance to the second variance is less than the variance threshold, then operation proceeds from step 780 to step 782, where the selection is to use the second binarization threshold generation function. In some such embodiments, the second binarization threshold generation function is a function of m1[P], v1[P], V1, m2[P], v2[P], V2 and Z. In some such embodiments, the scalar $\lambda$ is set to a value between $\phi$ and $\Phi*\phi$. In some embodiments, the second binarization generation function is such that it sets binarization threshold T=$(1-\lambda)*t2[P]+A*t1[P]$, where scalar A is a value between $\phi$ and $\Phi*\phi$, where $$t1[P] = (m1[P] - Z)\left(l_1 + l_2\left(\frac{v1[P]}{V1}\right)^2 - l_3\left(\frac{v1[P]}{V1}\right)\right) + Z$$

$$\text{and where, } t2[P] = (m2[P] - Z)\left(k_1 + k_2\left(\frac{v2[P]}{V2}\right)\right) + Z.$$

In some embodiments, said plurality of binarization threshold generation functions further includes a third binarization threshold generation function which generates a binarization threshold based the third variance, e.g., based on v3[P]. Returning to step 730, in step 730 a binarization generation function is selected from said plurality of binarization generation functions based on said third variance, e.g., v3[P], in addition to said first variance, e.g., v1[P], and said second variance, e.g., v2[P].

In one example, the first binarization generation function is based on t1[P]; the second binarization generation function is based on a weighted sum of t1[P] and t2[P]; and the third binarization generation function is based on a weighted sum of t1[P], t2[P] and t3[P], and t3[P] is a function of v3[P]. In some such embodiments, the second window includes the first window, and the third window includes the first window and the second window.

In some embodiments, the first binarization generation function generates said binarization threshold based on the first variance; the second binarization generation function generates said binarization threshold based on the first variance and the second variance; and the third binarization generation function generates said binarization threshold based on the first variance, the second variance, and the third variance. In some such embodiments, the second window includes the first window, and the third window includes the first window and the second window.

In some embodiments, the first binarization generation function generates said binarization threshold based on the first variance; the second binarization generation function generates said binarization threshold based on the first variance and the second variance; and the third binarization generation function generates said binarization threshold based on the first variance, and the third variance. In some such embodiments, the second window includes the first window, and the third window includes the first window.

Operation proceeds from step 724 via connecting node B 744 to step 746, in which a binarization threshold using said selected binarization generation function is generated. Step 746 includes steps 748, step 750 and step 754. In some embodiments, e.g., some embodiments including three windows corresponding to a pixel P, steps 752 and 756 are also included within step 746.

In step 748, it is determined whether the first binarization generation function has been selected. If the first binarization generation function was selected in step 724, then operation proceeds to step 750, in which the binarization threshold T is generated using the first binarization threshold generation function. Returning to step 748, if it is determined in step 748 that the first binarization generation function was not selected, and the embodiment does not use a third window per pixel, then operation proceeds from step 748 to step 754, in which the binarization threshold T is generated using the second binarization generation function.

Returning to step 748, if it is determined in step 748 that the first binarization generation function was not selected, and the embodiment uses three windows per pixel, then operation proceeds from step 748 to step 752, in which it is determined whether or not the second function was selected. If the second function was selected, then operation proceeds from step 752 to step 754, in which the binarization threshold T is generated using the second binarization function. Returning to step 752, if the second function was not selected, then operation proceeds from step 752 to step 756, in which in which the binarization threshold T is generated using the third binarization generation function.

Operation proceeds from step 746 to step 758, in which a bi-level value is generated from said input pixel value, e.g., P, based on a comparison of the input pixel value, e.g., P, to the binarization threshold, e.g., T, generated by the selected binarization threshold generation function. Operation proceeds from step 758 to step 760.

In step 760 the generated bi-level pixel value is stored on a storage device in a file including a set of bi-level pixel values representing said image. Operation proceeds from step 760 to step 762. In step 762 it is determined whether or not there are additional input pixels in the image to be processed. If it is determined that there are additional input pixels in the image to be processed, then operation proceeds from step 762 to step 764 in which the next input pixel to be processed is identified. Operation proceeds from step 764, via connecting node C 765 to step 708.

Returning to step 762, if in step 762 it is determined that there are no more input pixel values to be processed, then operation proceeds from step 762 to one or both of steps 766 and 768. In step 766 the file including a set of bi-level pixels values representing the image is communicated to another device. In step 768, a bi-level image generated from pixel values included in said set of pixel values is displayed on a display device, e.g., the bi-level image is generated using the stored bi-level pixel values in the file which was generated by multiple iterations including steps 708, 710, 712, 714, 724, 746, 758 and 760, which processed the input pixels in the image. Operation proceeds from steps 766 and 768 to end step 770.

Figures 8, 8A, 8B:
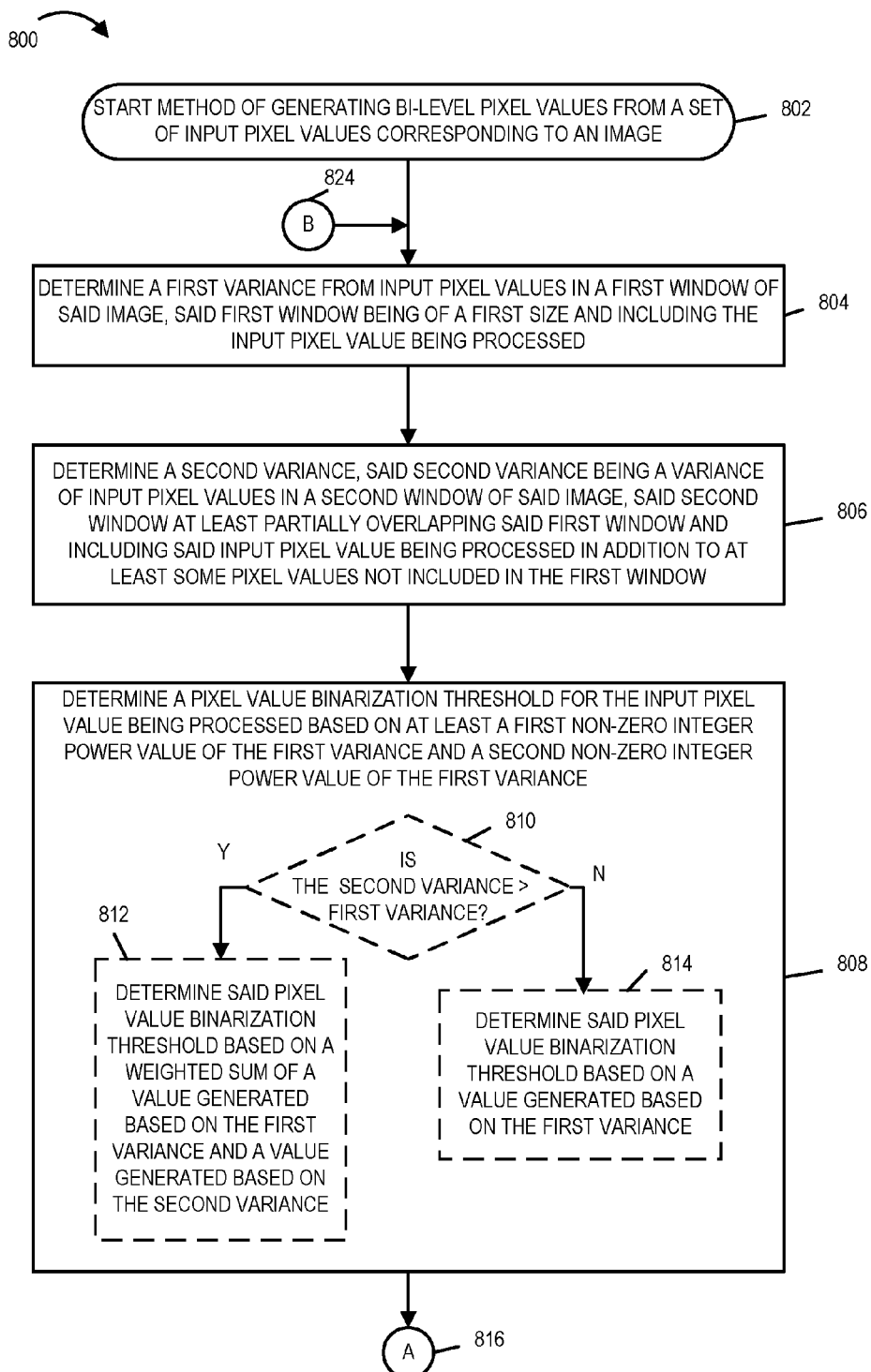
FIG. 8A is a first part of a flowchart of an exemplary method of generating bi-level pixel values from a set of input pixel values corresponding to an image in accordance with various exemplary embodiments.
FIG. 8B is a second part of a flowchart of an exemplary method of generating bi-level pixel values from a set of input pixel values corresponding to an image in accordance with various exemplary embodiments.
Figure 8B:
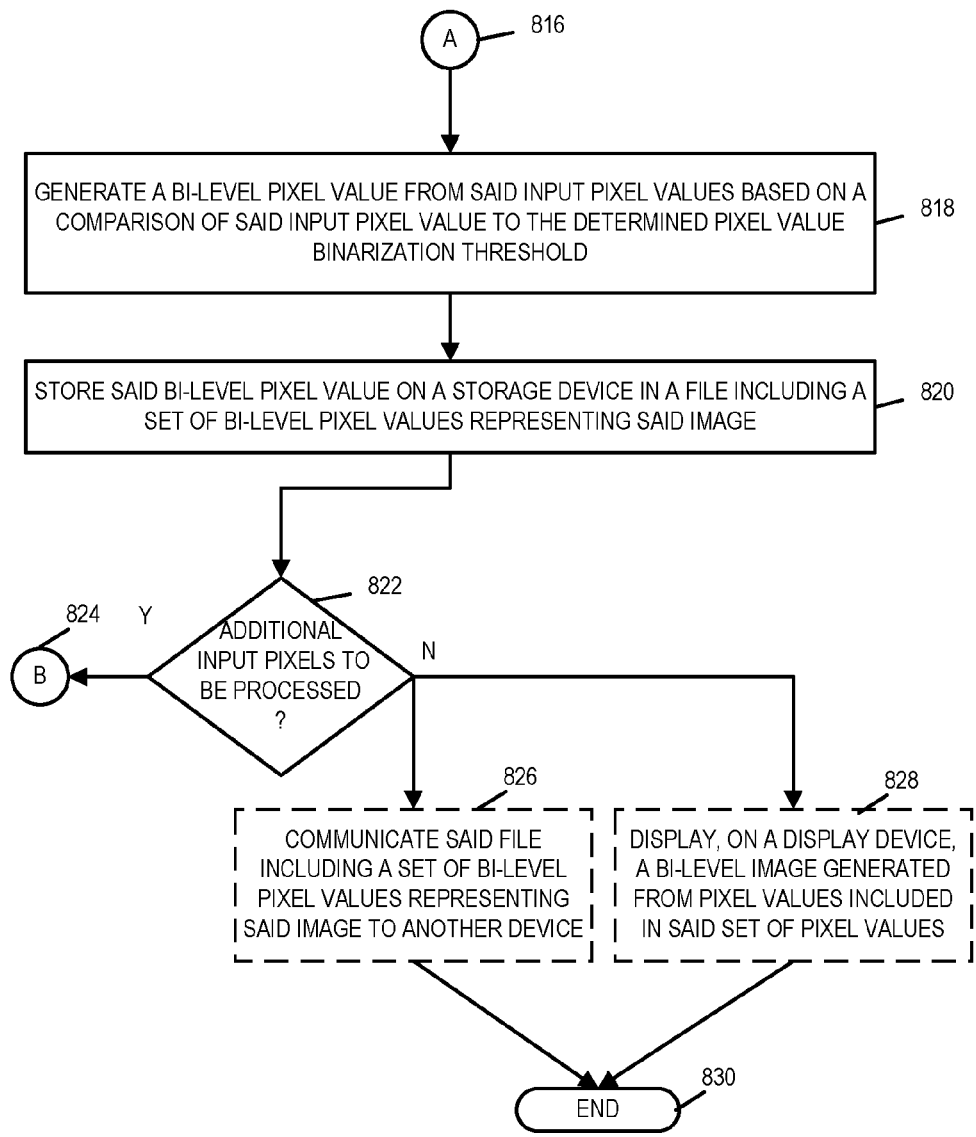

FIG. 8, comprising the combination of FIG. 8A and FIG. 8B, is a flowchart 800 of an exemplary method of generating bi-level pixel values from a set of input pixel values corresponding to an image in accordance with various exemplary embodiments. The exemplary method of FIG. 8 may be implemented by the computer system 900 of FIG. 9. Operation of the exemplary method starts in step 802 and proceeds to step 804.

In step 804, a first variance, e.g., v1[P] is determined from input pixel values in a first window of said image, said first window being of a first size and including the input pixel value being processed. Operation proceeds from step 804 to step 806.

In step 806, a second variance, e.g., v2[P] is determined, said second variance being a variance of input pixels in a second window, said second window at least partially overlapping said first window and including said input pixel value being processed in addition to at least some pixel values not included in the first window. Operation proceeds from step 806 to step 808.

In step 808 a pixel value binarization threshold is determined for the input pixel value being processed based on at least a first non-zero integer power value of the first variance and second non-zero integer power value of the first variance. In some embodiments, determining a pixel value binarization threshold does not involve the use of the fractional power of the first variance.

In some embodiments, step 808 includes steps 810, 812 and 814. In step 810 the second variance is compared to the first variance. If it is determined that the second variance is not greater than the first variance, then operation proceeds from step 810 to step 814, in which the pixel value binarization threshold is determined based on a value generated based on the first variance, e.g., based on t1[P]. In some such embodiments, the pixel value binarization threshold is set equal to t1[P], where:

$$t1[P] = (m1[P] - Z)\left(l_1 + l_2\left(\frac{v1[P]}{V1}\right)^2 - l_3\left(\frac{v1[P]}{V1}\right)\right) + Z$$

where m1[P] is the mean of the pixel values in the first, e.g., primary, window for the current pixel P, e.g., the primary window centered at the current pixel P, v1[P] is the variance of the pixel values in the first window for the current pixel P, V1 is the maximum of the variances of all first windows in the image, Z is the minimum value of all pixels in the image, and $l_1, l_2, l_3$ are positive numbers less than one. Exemplary value for $l_1$ is 0.8575. Exemplary value for $l_2$ is 0.07. Exemplary value for $l_3$ is 0.03.

However, if it is determined, in step 810 that the second variance is greater than the first variance, then operation proceeds from step 810 to step 812. In step 812 the pixel value binarization threshold, e.g., T, is determined based on a weighted sum of a value generated based on the first variance and a value generated based on the second variance. In some such embodiments, determining a pixel value binarization threshold does not involve the use of the fractional power of the second variance.

In some such embodiments in step 812, the pixel value binarization threshold T is set equal to $(1-\lambda)*t2[P]+\lambda*t1[P]$, where $$t1[P] = (m1[P] - Z)\left(l_1 + l_2\left(\frac{v1[P]}{V1}\right)^2 - l_3\left(\frac{v1[P]}{V1}\right)\right) + Z;$$

$$\text{where, } t2[P] = (m2[P] - Z)\left(k_1 + k_2\left(\frac{v2[P]}{V2}\right)\right) + Z;$$

where $\Phi = \max(V1/V2, 1)$;
where $\phi = v1/v2$
where scalar $\lambda$ is a value between $\phi$ and $\Phi*\phi$.

where m1[P] is the mean of the pixel values in the first, e.g., primary, window for the current pixel P, e.g., the primary window centered at the current pixel P, v1[P] is the variance of the pixel values in the first window for the current pixel P, V1 is the maximum of the variances of all first windows in the image,
where m2[P] is the mean of the pixel values in the second, e.g., secondary, window for the current pixel P, e.g., the secondary window centered at the current pixel P, v2[P] is the variance of the pixel values in the second window for the current pixel P, V2 is the maximum of the variances of all second windows in the image, Z is the minimum value of all pixels in the image, and $l_1, l_2, l_3$ are positive numbers less than one, and $k_1, k_2$ are positive numbers less than one. Exemplary value for $k_1$ is 0.725. Exemplary value for $k_2$ is 0.275. Exemplary value for $l_1$ is 0.8575. Exemplary value for $l_2$ is 0.07. Exemplary value for $l_3$ is 0.03. Exemplary value for $k_1$ is 0.725. Exemplary value for $k_2$ is 0.275.

Operation proceeds from step 808 via connecting node A 816 to step 818.

In step 818, a bi-level pixel value is generated from said input pixel value based on a comparison of said input pixel value to the determined pixel value binarization threshold, e.g., T. Operation proceeds from step 818 to step 820.

In step 820 the generated bi-level pixel value is stored on a storage device in a file including a set of bi-level pixel values representing said image. Operation proceeds from step 820 to step 822.

In step 822 a determination is made as to whether or not there are additional input pixels to be processed. If it is determined that there are additional input pixels values to be processed, then another input pixel value to be processed is identified and operation proceeds from step 822, via connecting node B 824 to step 804.

Returning to step 822, if it is determined that there are no additional input pixels values to be processed, then operation proceeds from step 822 to one or more of steps 826 and 828. In step 826, the file including a set of bi-level pixel values representing said image is communicated to another device. In step 828 a bi-level image, generated from pixel values included in said set of input pixel values, is displayed on display device, e.g., the stored file including a set of bi-level pixel values representing the image is displayed on the display device. Operation proceeds from steps 826 and 828 to end step 830.

Figure 9:
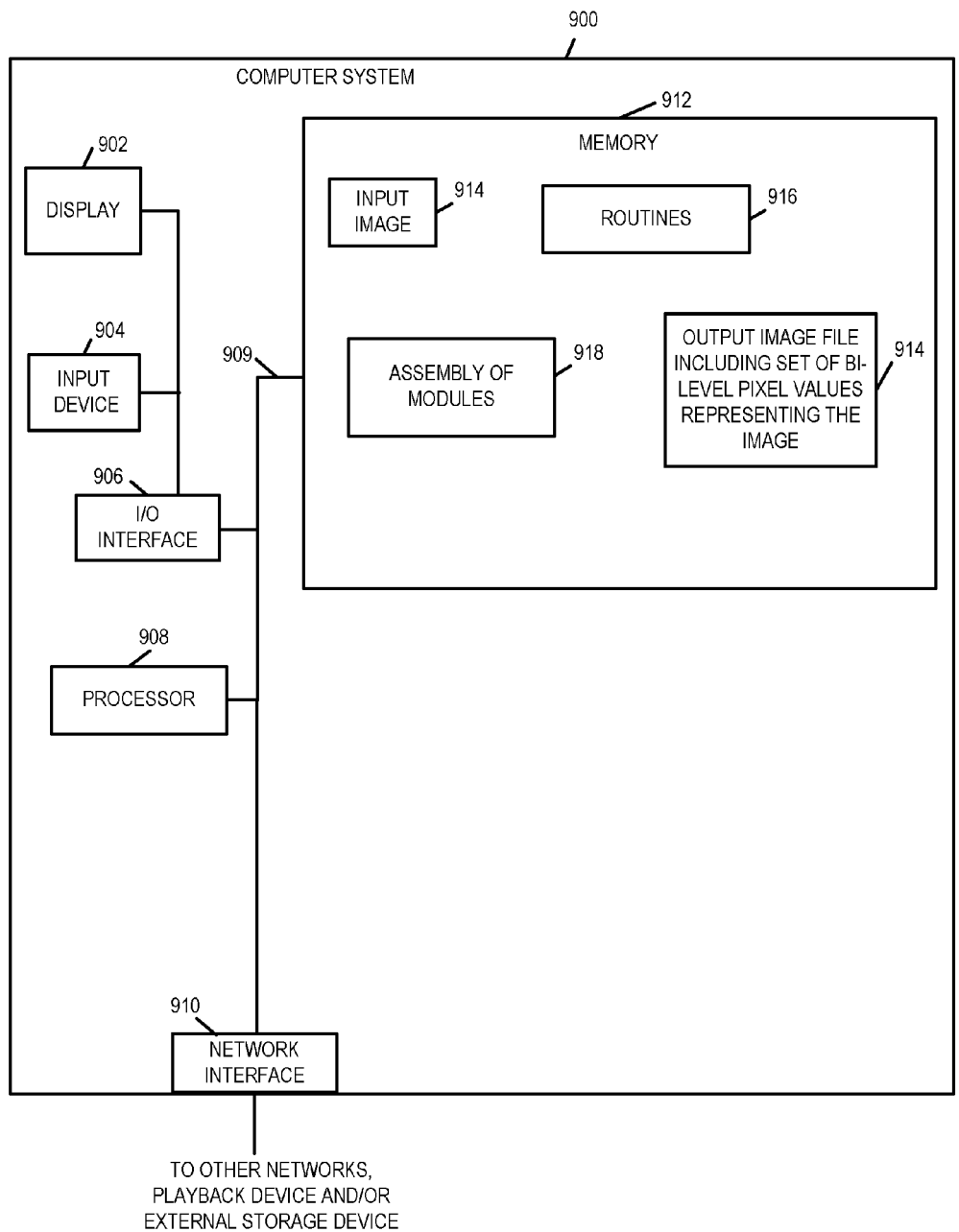
FIG. 9 illustrates an exemplary apparatus, e.g., a computer system, capable of implementing a method to generate bi-level pixel values from a set of input pixel values corresponding to an image, in accordance with various embodiments of the present invention.

FIG. 9 illustrates an apparatus, e.g., a computer system 900, capable of processing data, e.g., image data, in accordance with the present invention. The system 900 includes various modules for performing the steps of methods of the present invention, e.g., such as the methods of flowchart 100 of FIG. 1, of flowchart 200 FIG. 2, of flowchart 300 of FIG. 3, of flowchart 700 of FIG. 7, and/or flowchart 800 of FIG. 8. In some embodiments the apparatus also stores both the input image data, e.g., a file including input pixel values corresponding to an image to be processed, and processed image data, e.g., a file including a set of bi-level pixel values representing the image.

As shown in FIG. 9, the computer system 900 includes a display 902, an input device 904, an input/output interface 906, a processor 908, a network interface 910 and a memory 912 coupled together by a bus 909 over which the various elements may exchange data and information. The display 902 can be used to display an input image, e.g., a color or grayscale image, and a corresponding bi-level image of bi-level pixel values generated from input pixel values of the input image in accordance with the invention and for displaying one or more control screens which may display control information, e.g., user selected control parameters and information. The user can input control parameters using the input device 904 which may be, e.g., a keyboard or other input device. The I/O interface 910 includes transmitters and receivers for transmitting and receiving information. The processor 908 performs various operations in accordance with the invention, e.g., under direction of routines 916 and/or one or more of the modules stored in the assembly of modules 918. In some embodiments, the each of the modules in the assembly of modules is included in with routines 916. Routines 916 includes, e.g., main routines and subroutines. While the assembly of modules 918 includes various software modules, the modules may and in some embodiments are, implemented in hardware. In some embodiments, some modules in the assembly of modules 918 are implemented in hardware and other modules in the assembly of modules 918 are implemented in software.

The memory 912 includes input image data 914 to be processed. The input image data includes a set of input pixel values corresponding to an image, e.g., a color or grayscale image, to be processed. The output image file 914 includes a set of bi-level pixel values representing the image which is the output at the completion of processing performed in accordance with a method of the invention.

Figures 10, 10A:
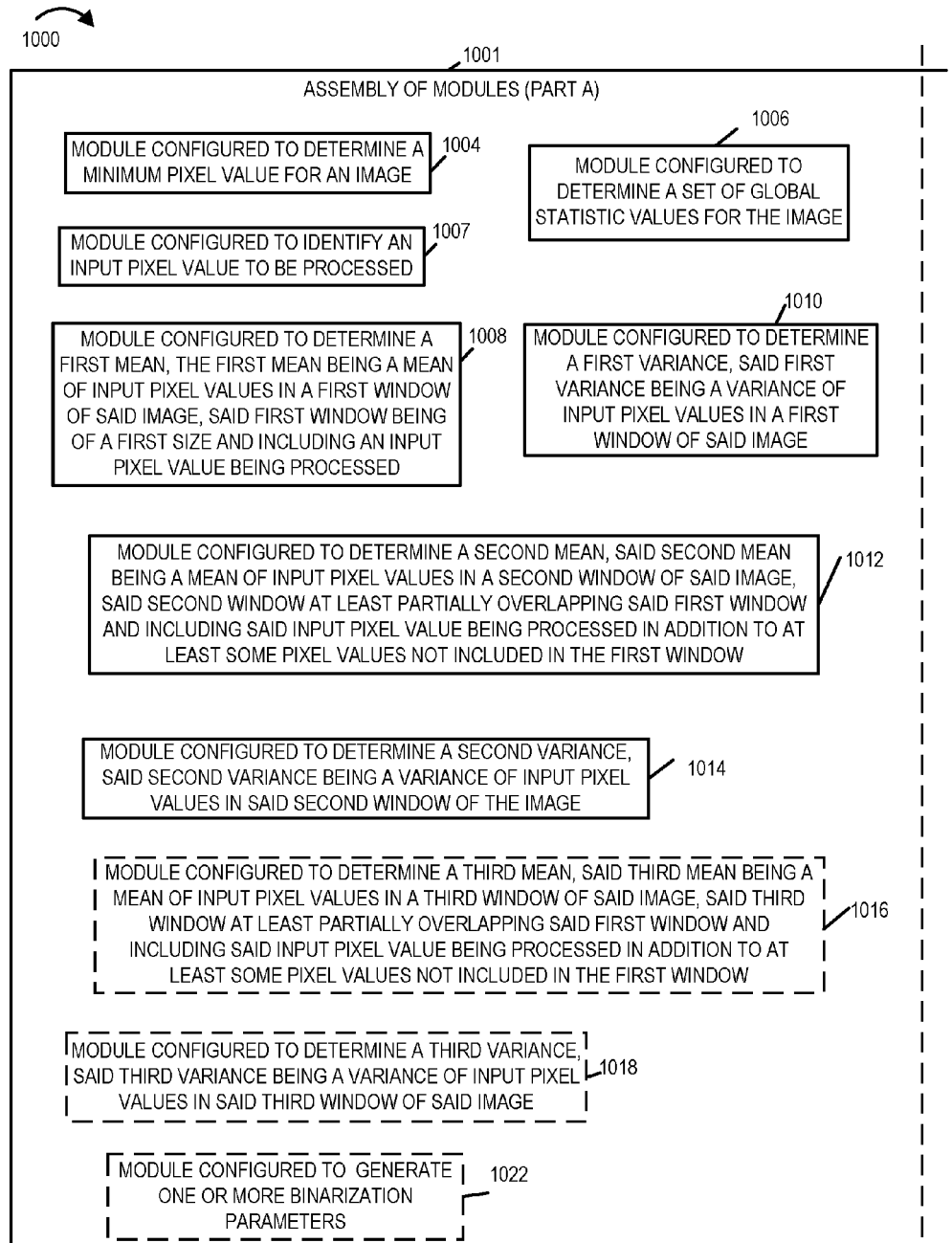
FIG. 10A illustrates a first part of an assembly of modules which can, and in some embodiments is, used in the exemplary system illustrated in FIG. 9.
Figure 10B:
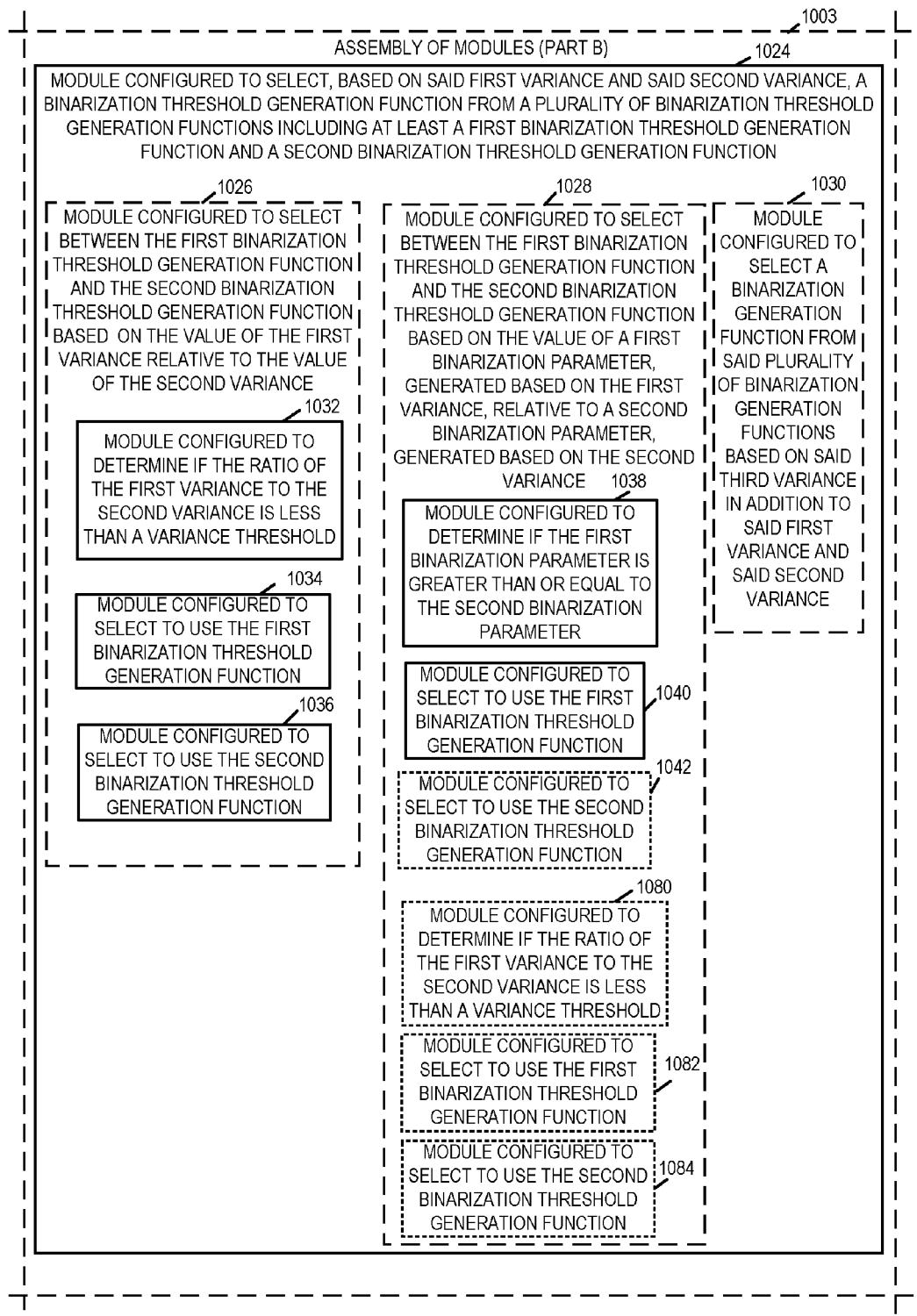
FIG. 10B illustrates a second part of an assembly of modules which can, and in some embodiments is, used in the exemplary system illustrated in FIG. 9.
Figure 10C:
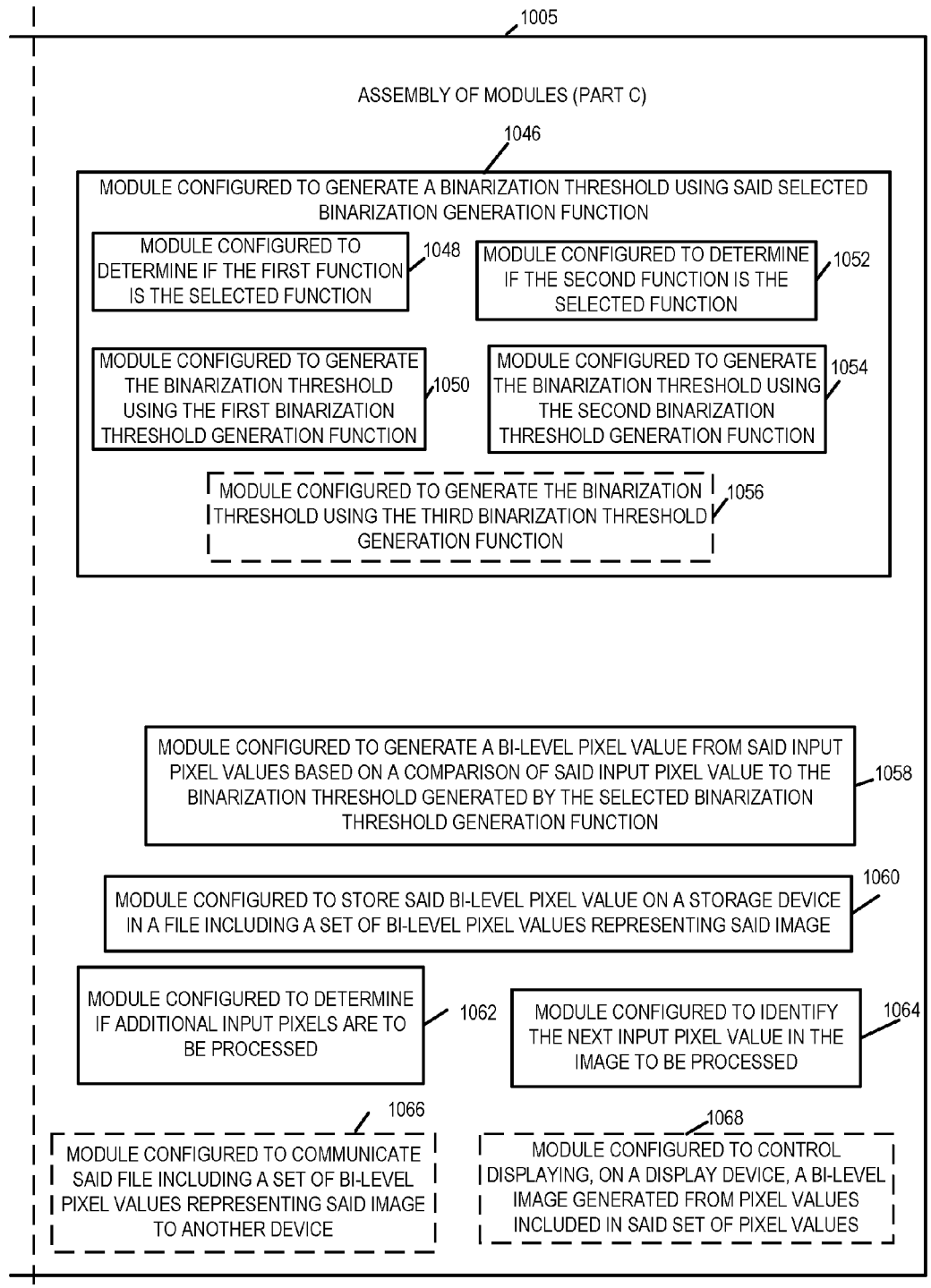
FIG. 10C illustrates a third part of an assembly of modules which can, and in some embodiments is, used in the exemplary system illustrated in FIG. 9.

FIG. 10, which comprises a combination of FIGS. 10A, 10B and 10C, illustrates an assembly of modules 1000 which can, and in some embodiments is, used in the exemplary system 900 illustrated in FIG. 9, e.g., as assembly of modules 918. Assembly of modules 1000 includes part A 1001 of the assembly of modules shown in FIG. 10A, part B 1003 of the assembly of modules shown in FIG. 10B and part C 1005 of the assembly of modules shown in FIG. 10C. Assembly of modules 1000 can be implemented in hardware within the processor 908 of the system 900, e.g., as individual circuits. The modules in the assembly 1000 can, and in some embodiments are, implemented fully in hardware within the processor 908, e.g., as individual circuits. In other embodiments some of the modules are implemented, e.g., as circuits, within the processor 908 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 912 of the system 900 with the modules controlling operation of system 900 to implement the functions corresponding to the modules when the modules are executed by a processor, e.g., processor 908. In some such embodiments, the assembly of modules 1000 is included in the memory 912. In still other embodiments, various modules are implemented as a combination of hardware and software, e.g., with another circuit external to the processor providing input to the processor 908 which then under software control operates to perform a portion of a module's function. While shown in the FIG. 9 embodiment as a single processor, e.g., computer, it should be appreciated that the processor 908 may be implemented as one or more processors, e.g., computers.

When implemented in software the modules include code, which when executed by the processor 908, configure the processor 908 to implement the function corresponding to the module. In embodiments where the assembly of modules 1000 is stored in the memory 912, the memory 912 is a computer program product comprising a computer readable medium comprising code, e.g., individual code for each module, for causing at least one computer, e.g., processor 908, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 10 control and/or configure the system 900 or elements therein such as the processor 908, to perform the functions of the corresponding steps illustrated in the method flowchart 700 of FIG. 7. Thus the assembly of modules 1000 includes various modules that perform functions of the corresponding steps of the method shown in FIG. 7.

As illustrated in FIG. 10, the assembly of modules 1000 includes a module 1004 configured to determine a minimum pixel value, e.g., Z, from a set of input pixel values corresponding to an image, a module 1006 configured to determine a set of global statistic values for the image, e.g., V1, V2, Φ, or V1, V2, V3, a module 1007 configured to identify an input pixel value to be processed, a module 1008 configured to determine a first mean, e.g., m1[P], the first mean being a mean of input pixel values in a first window of the image, the first window being of a first size and including an input pixel being processed, and a module 1010 configured to determine a first variance, e.g., v1[P] the first variance being a variance of input pixel values in the first window of the image.

The assembly of modules 1000 further includes a module 1012 configured to determine a second mean, e.g., m2[P], the second mean being a mean of input pixel values in a second window of the image, the second window at least partially overlapping the first window and including the input pixel value being processed in addition to at least some pixel values not included in the first window, a module 1014 configured to determine a second variance, e.g., v2[P], the second variance being a variance of input pixel values in the second window of the image, a module 1016 configured to determine a third mean, e.g., m3[P], the third mean being a mean of input pixel values in a third window of the image, the third window at least partially overlapping the first window and including the input pixel value being processed in addition to at least some pixel values not included in the first window, a module 1018 configured to determine a third variance, e.g., v3[P], the third variance being a variance of input pixel values in the third window of the image and a module 1022 configured to generate one or more binarization parameters, e.g., t1[P], or t1[P] and t2[P], or t1[P], t2[P] and t3[P]. The module 1022 is used in some embodiments to generate various binarization parameters in accordance with the invention. For example, in some embodiments, the module 1022 uses the following equation to compute a first binarization parameter t1[P]:

$$t1[P] = (m1[P] - Z)\left(l_1 + l_2\left(\frac{v1[P]}{V1}\right)^2 - l_3\left(\frac{v1[P]}{V1}\right)\right) + Z$$

where m1[P] is the mean of the pixel values in the first, e.g., primary, window for the current pixel P, e.g., the primary window centered at the current pixel P, v1[P] is the variance of the pixel values in the first window for the current pixel P, V1 is the maximum of the variances of all first windows in the image, Z is the minimum value of all pixels in the image, and $l_1$, $l_2$, $l_3$ are positive numbers less than one. Exemplary value for $l_1$ is 0.8575. Exemplary value for $l_2$ is 0.07. Exemplary value for $l_3$ is 0.03.

The assembly of modules 1000 in some embodiments further includes a module 1024 configured to select, based on the first and second variance, a binarization threshold generation function from a plurality of binarization threshold generation functions including at least a first binarization threshold generation function and a second binarization threshold generation function, and a module 1046 configured to generate a binarization threshold using the selected binarization threshold function, e.g., selected by module 1024.

In some embodiments the module 1024 includes a module 1026 configured to select between the first threshold binarization generation function and the second binarization threshold generation function based on the value of the first variance, e.g., v1[P] relative to the value of the second variance, e.g., v2[P], a module 1028 configured to select between the first binarization threshold generation function and the second binarization generation function based on the value of a first binarization parameter generated based on the value of the first variance, relative to a second binarization parameter generated based on the second variance, and a module 1030 configured to select a binarization generation function from the plurality of binarization generation functions based on the third variance, e.g., v3[P], in addition to the first variance and the second variance.

In some embodiments the module 1026 includes a module 1032 configured to compare the ratio of the first variance to the second variance, e.g., v1[P]/v2[P], to a variance threshold, e.g., L, and determine if the ratio of the first variance to the second variance is less than the variance threshold, a module 1034 configured to select to use the first binarization threshold generation function when the module 1032 determines that the ratio of the first variance to the ratio of the second variance is not less than the variance threshold, and a module 1036 configured to select to use the second binarization threshold generation function if the ratio of the first variance to the ratio of the second variance is less than the variance threshold. In some embodiments, the first binarization threshold function is a function of v1[P]. In some such embodiments, the first binarization threshold function is equal to t1[P]. In some embodiments, the second binarization threshold function is a function of v1[P] and v2[P]. In some embodiments, the second binarization function is a function of v2[P] and the first binarization threshold generation function.

In some embodiments, the module 1028 includes a module 1038 configured to compare and determine if the first binarization parameter, e.g. t1[P], is greater than or equal to the second binarization parameter, e.g., t2[P], a module 1040 configured to select to use the first binarization threshold generation function when the first binarization parameter is greater than or equal to the second binarization parameter, and a module 1042 configured to select to use the second binarization threshold generation function when the first binarization parameter is not greater than or equal to the second binarization parameter. In various embodiments, if it is determined that the first binarization parameter is greater than or equal to the second binarization parameter the first binarization threshold generation function is selected and if it is determined that the first binarization parameter is not greater than or equal to the second binarization parameter, the second binarization threshold generation function is selected to be used. In some embodiments, the first binarization threshold generation function is a function of v1[P]. In some such embodiments, the first binarization threshold generation function is equal to t1[P]. In some embodiments, the second binarization threshold generation function is a function of v2[P]. In some embodiments, the second binarization threshold generation function is equal to t2[P].

In some embodiments, the module 1028 includes a module 1038 configured to compare and determine if the first binarization parameter, e.g. t1[P], is greater than or equal to the second binarization parameter, e.g., t2[P], a module 1040 configured to select to use the first binarization threshold generation function when the first binarization parameter is greater than or equal to the second binarization parameter, a module 1080 configured to compare the ratio of the first variance to the second variance, e.g., v1[P]/v2[P], to a variance threshold, e.g., L, and determine if the ratio of the first variance to the second variance is less than the variance threshold, e.g., when it is determined that the first binarization parameter is not greater than or equal to the second binarization parameter, a module 1082 configured to select to use the first binarization threshold generation function when the module 1080 determines that the ratio of the first variance to the ratio of the second variance is not less than the variance threshold, and a module 1084 configured to select to use the second binarization threshold generation function if module 1080 determines that the ratio of the first variance to the ratio of the second variance is less than the variance threshold. In some embodiments, the first binarization threshold function is a function of v1[P]. In some such embodiments, the first binarization threshold function is equal to t1[P]. In some embodiments, the second binarization threshold function is a function of v1[P] and v2[P]. In some embodiments, the second binarization function is a function of v2[P] and the first binarization threshold generation function. In some such embodiments, the second binarization function is a function of the first binarization parameter and the second binarization parameter.

In some embodiments the assembly of modules 1000 further includes a module 1046 configured to generate a binarization threshold using said selected binarization generation function. In some embodiments the module 1046 includes a module 1048 configured to determine if the first binarization generation function has been selected, a module 1050 configured to generate the binarization threshold T, using the first binarization threshold generation function, a module 1052 configured to determine if the second binarization generation function has been selected, a module 1054 configured to generate the binarization threshold T, using the second binarization threshold generation function, and a module 1056 configured to generate the binarization threshold T using a third binarization threshold generation function.

The assembly of modules 1000 further includes a module 1058 configured to generate a bi-level value from the input pixel value, e.g., P, based on a comparison of the input pixel value to the binarization threshold, e.g., T, generated by the selected binarization threshold generation function, a module 1060 configured to store the generated bi-level pixel value on a storage device in a file including a set of bi-level pixel values representing said image, a module 1062 configured to determine whether or not there are additional input pixels in the image to be processed, a module 1064 configured to identify the next input pixel to be processed if the module 1062 determines that there are additional input pixels in the image to be processed. In some embodiments the assembly of modules 1000 further includes a module 1066 configured to communicate the file including a set of bi-level pixels values representing the image to another device, and a module 1068 configured to control displaying of a bi-level image generated from pixel values included in said set of pixel values on a display device.

In some embodiments, one or more modules shown in FIG. 10 which are included within another module may be implemented as an independent module or modules.

Figure 11:
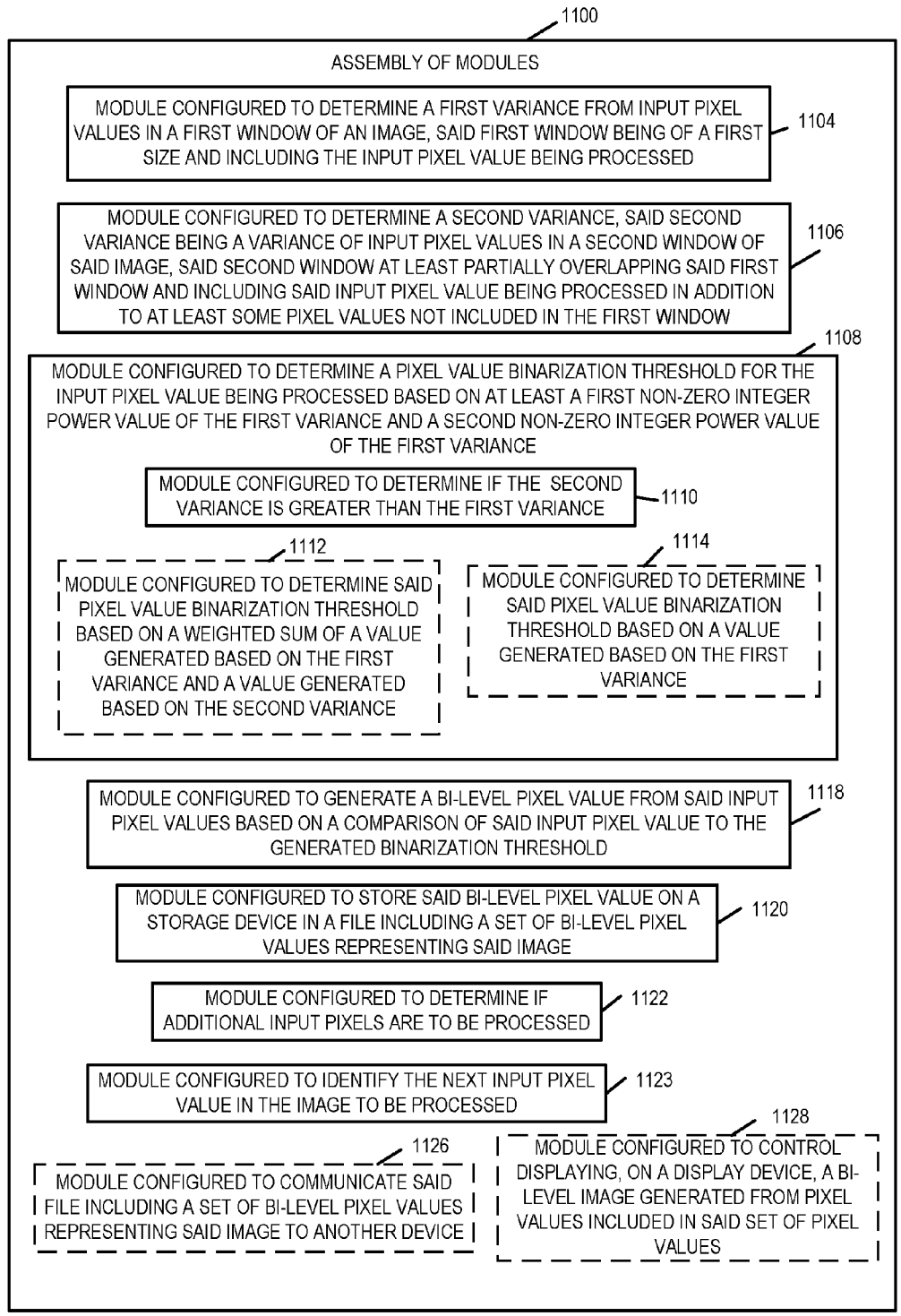
FIG. 11 illustrates an assembly of modules which can, and in some embodiments is, used in the exemplary system illustrated in FIG. 9.

FIG. 11 illustrates an assembly of modules 1100 which can, and in some embodiments is, used in the exemplary system 900 illustrated in FIG. 9, e.g., as part of assembly of modules 918. Assembly of modules 1100 can be implemented in hardware within the processor 908 of the system 900, e.g., as individual circuits. The modules in the assembly 1100 can, and in some embodiments are, implemented fully in hardware within the processor 908, e.g., as individual circuits. In other embodiments some of the modules are implemented, e.g., as circuits, within the processor 908 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 912 of the system 900 with the modules controlling operation of system 900 to implement the functions corresponding to the modules when the modules are executed by a processor, e.g., processor 908. In some such embodiments, the assembly of modules 1100 is included in the memory 912. In still other embodiments, various modules are implemented as a combination of hardware and software, e.g., with another circuit external to the processor providing input to the processor 908 which then under software control operates to perform a portion of a module's function. While shown in the FIG. 9 embodiment as a single processor, e.g., computer, it should be appreciated that the processor 908 may be implemented as one or more processors, e.g., computers.

When implemented in software the modules include code, which when executed by the processor 908, configure the processor 908 to implement the function corresponding to the module. In embodiments where the assembly of modules 1100 is stored in the memory 912, the memory 912 is a computer program product comprising a computer readable medium comprising code, e.g., individual code for each module, for causing at least one computer, e.g., processor 908, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 11 control and/or configure the system 900 or elements therein such as the processor 908, to perform the functions of the corresponding steps illustrated in the method flowchart 800 of FIG. 8. Thus the assembly of modules 1100 includes various modules that perform functions of the corresponding steps of the method shown in FIG. 8.

As illustrated in FIG. 11, the assembly of modules 1100 includes a module 1104 configured to determine a first variance, e.g., v1[P], from input pixel values in a first window of an image, the first window being of a first size and including the input pixel value being processed, a module 1106 configured to determine a second variance, e.g., v2[P], the second variance being a variance of input pixel values in a second window of the image, the second window at least partially at least partially overlapping the first window and including the input pixel value being processed in addition to at least some pixel values not included in the first window, and a module 1108 configured to determine a pixel value binarization threshold for the input pixel value being processed based on at least a first non-zero integer power value of the first variance and a second non-zero integer power value of the first variance. In some embodiments, determining a pixel value binarization threshold does not involve the use of the fractional power of the first variance. In some embodiments module 1108 includes a module 1110 configured to determine if the second variance is greater than the first variance, a module 1112 configured to determine the pixel value binarization threshold, e.g., T, based on a weighted sum of a value generated based on the first variance and a value generated based on the second variance, and a module 1114 configured to determine the pixel value binarization threshold based on a value generated based on the first variance, e.g., based on t1[P].

In various embodiments the assembly of modules 1100 further includes a module 1118 configured to generate a bi-level pixel value from the input pixel value based on a comparison of the input pixel value to the determined pixel value binarization threshold, a module 1120 configured to store the generated bi-level pixel value on a storage device in a file including a set of bi-level pixel values representing said image, a module 1122 configured to determine whether or not there are additional input pixels to be processed, and a module 1123 configured to identify the next input pixel to be processed if the module 1122 determines that there are additional input pixels in the image to be processed. In some embodiments the assembly of modules 1100 further includes a module 1126 configured to communicate the file including a set of bi-level pixels values representing the image to another device, and a module 1128 configured to control displaying of a bi-level image generated from pixel values included in said set of pixel values, e.g., on a display device.

In some embodiments, one or more modules shown in FIG. 11 which are included within another module may be implemented as an independent module or modules.

A method of generating bi-level pixel values from a set of input pixel values corresponding to an image, in accordance with some embodiments, includes: determining a first variance (v1[P]), said first variance being a variance of input pixel values in a first window of said image, said first window being of a first size and including an input pixel value being processed; determining a second variance (v2[P]), said second variance being a variance of input pixel values in a second window of said image, said second window at least partially overlapping said first window and including said input pixel value being processed in addition to at least some pixel values not included in said first window; selecting, based on said first variance and said second variance, a binarization threshold generation function from a plurality of binarization threshold generation functions, said plurality of binarization threshold generation functions including at least a first binarization threshold generation function and a second binarization threshold function; and generating a bi-level pixel value from said input pixel value based on a comparison of said input pixel value to a binarization threshold (T) generated by the selected binarization threshold generation function.

In some embodiments, said first binarization threshold generation function generates said binarization threshold based on pixel values in said first window and said second binarization threshold generation function generates said binarization threshold based on pixel values in the second window. In some such embodiments, said second binarization threshold generation function generates said binarization threshold based on pixel values in said first window.

In various embodiments, said second window is larger than said first window. In some such embodiments, said first window is fully within said second window.

In some embodiments, said first window partially overlaps said second window. In some such embodiments, said first and second windows are the same size.

In various embodiments, selecting a binarization threshold generation function from a plurality of binarization threshold generation functions includes: selecting between the first binarization threshold generation function and the second binarization threshold generation function based on the value of the first variance (v1[P]) relative to the value of the second variance (v2[P]).

In some embodiments, selecting a binarization threshold generation function from a plurality of binarization threshold generation functions includes: determining if the ratio of the first variance (v1[P]) to the second variance (v2[P]) is less than a variance threshold (L); and selecting to use the second binarization threshold generation function when the ratio of the first variance (v1[P]) to the second variance (v2[P]) is less than a variance threshold (L). In some such embodiments, said variance threshold (L) is one, and said second binarization threshold generation function is selected when the first variance (v1[P]) is less than the second variance (v2[P]).

In various embodiments, selecting a binarization threshold generation function from a plurality of binarization threshold generation functions includes: selecting between the first binarization threshold generation function and the second binarization threshold generation function based on the value of a first binarization parameter (t1[P]), generated based on the first variance (v1[P]), relative to the value of a second binarization parameter (t2[P]), generated based on the second variance, (v2[P]). In some such embodiments, the first function=t1[P], and the second function=t2[P], and the selection between first and second binarization threshold generation functions is based on comparison of t1[P] and t2[P], e.g., is t1[P]≥t2[P].

In various embodiments, selecting a binarization threshold generation function from a plurality of binarization threshold generation functions includes: selecting between the first binarization threshold generation function and the second binarization threshold generation function based on the value of a first binarization parameter (t1[P]), generated based on the first variance (v1[P]), relative to the value of a second binarization parameter (t2[P]), generated based on the second variance, (v2[P]). In some such embodiments, the first function=t1[P], and the second function=t2[P], and the selection between first and second binarization threshold generation functions is based on comparison of t1[P] and t2[P], e.g., is t1[P]≥t2[P]. In some such embodiments, if the first binarization parameter is greater than or equal to the second binarization parameter, then the first binarization threshold function is selected to be the binarization threshold function, however, if the first binarization parameter is not greater than or equal to the second binarization parameter, then an additional comparison is performed to select the binarization threshold function. In some such embodiments, selecting a binarization threshold generation function from a plurality of binarization threshold generation functions further includes: determining if the ratio of the first variance (v1[P]) to the second variance (v2[P]) is less than a variance threshold (L); and selecting to use the second binarization threshold generation function when the ratio of the first variance (v1[P]) to the second variance (v2[P]) is less than the variance threshold (L). In some such embodiments, the exemplary method further includes selecting to use the first binarization threshold generation function when the ratio of the first variance (v1[P]) to the second variance (v2[P]) is not less than the variance threshold (L). In some such embodiments, the first binarization threshold generation function is a function of the first binarization parameter (t1[P]). In some such embodiments, the second binarization threshold generation function is a function of the first binarization parameter (t1[P]) and the second binarization parameter (t2[P]). In some such embodiments, the first binarization threshold generation function equals the first binarization parameter.

In some embodiments, selecting a binarization threshold generation function from a plurality of binarization threshold generation functions includes: determining if the ratio of the first variance (v1[P]) to the second variance (v2[P]) is less than a variance threshold (L); and selecting to use the second binarization threshold generation function when the first binarization parameter (t1[P]) is less than the second binarization parameter (t2[P]) and the ratio of the first variance (v1[P]) to the second variance (v2[P]) is less than a variance threshold (L).

In various embodiments, said first and second windows are rectangular windows including different numbers of rows of pixel values, different numbers of columns of pixel values, or different numbers of both rows and columns of pixel values.

In some embodiments, the first binarization threshold generation function generates said binarization threshold based on at least a first non-zero integer power value of the first variance (v1[P]) and a second non-zero integer power value of the first variance(v1$^2$[P]).

In some such embodiments, said first binarization threshold generation function does not use of a fractional power of said first variance to generate said binarization threshold, e.g., a square root computation, used in prior art to determine standard deviation, is intentionally avoided.

In various embodiments, said first binarization threshold generation function generates said binarization threshold from pixel values included in said first window without use of pixel values from portions of said second window which are not included in said first window; and said second binarization threshold generation function generates said binarization threshold from a weighted sum of a first binarization parameter (t1[P]) generated based on the first variance and a second binarization parameter (t2[P]) generated based on the second variance (v2[P]). In some such embodiments, said second binarization threshold generation function generates said binarization threshold based on a first non-zero integer power value of the second variance. In some such embodiments, said second binarization threshold generation function generates said binarization threshold based on at least a first non-zero integer power value of the first variance (v1[P]) and a second non-zero integer power value of the first variance (v1$^2$[P]).

In some embodiments, the exemplary method includes determining a third variance (v3[P]), said third variance being a variance of input pixel values in a third window of said image, said third window at least partially overlapping said first window and including said input pixel value being processed in addition to at least some pixel values not included in said first window; and said plurality of binarization threshold generation functions further includes a third binarization threshold generation function which generates a binarization threshold based on said third variance; and selecting a binarization threshold generation function from a plurality of binarization threshold generation functions includes selecting based on said third variance (v3[P]) in addition to said first variance (v1[P]) and second variance v2[P]. In some such embodiments, said third binarization threshold generation function generates said binarization threshold based on a weighted sum of a first binarization parameter (t1[P]) generated based on said first variance (v1[P]), a second binarization parameter (t2[P]) generated based on said second variance (v2[P]) and a third binarization parameter (t3[P]) generated based on said third variance (v3[P]).

In some embodiments, said first binarization generation function generates said binarization threshold based on said first variance, said second binarization generation function generates said binarization threshold based on said second variance; and said third binarization generation function generates said binarization threshold based on said third variance.

In some such embodiments, the second binarization generation function generates said binarization threshold based on said first variance and said second variance; and said third binarization generation function generates said binarization threshold based on said first variance, said second variance and said third variance.

In some embodiments, second binarization generation function generates said binarization threshold based on said first variance and said second variance; and said third binarization generation function generates said binarization threshold based on said first variance, and said third variance.

In various embodiments, the exemplary method includes storing said bi-level pixel value on a storage device in a file including a set of bi-level pixel values representing said image or communicating said file including a set of bi-level pixel values representing said image to another device. In some embodiments, the exemplary method includes displaying, on a display device, a bi-level image generated from pixel values included in said set of pixel values.

An exemplary computer program product, for use in a computer, in accordance with some embodiments, comprises: a non-transitory computer readable medium comprising: code for causing said computer to determine a first variance (v1[P]), said first variance being a variance of input pixel values in a first window of an image, said first window being of a first size and including an input pixel value being processed; code for causing said computer to determine a second variance (v2[P]), said second variance being a variance of input pixel values in a second window of said image, said second window at least partially overlapping said first window and including said input pixel value being processed in addition to at least some pixel values not included in said first window; code for causing said computer to select, based on said first variance and said second variance, a binarization threshold generation function from a plurality of binarization threshold generation functions, said plurality of binarization threshold generation functions including at least a first binarization threshold generation function and a second binarization threshold function; and code for causing said computer to generate a bi-level pixel value from said input pixel value based on a comparison of said input pixel value to a binarization threshold (T) generated by the selected binarization threshold generation function.

An exemplary computer, in accordance with some embodiments, comprises: at least one processor configured to: determine a first variance (v1[P]), said first variance being a variance of input pixel values in a first window of said image, said first window being of a first size and including an input pixel value being processed; determine a second variance (v2[P]), said second variance being a variance of input pixel values in a second window of said image, said second window at least partially overlapping said first window and including said input pixel value being processed in addition to at least some pixel values not included in said first window; select, based on said first variance and said second variance, a binarization threshold generation function from a plurality of binarization threshold generation functions, said plurality of binarization threshold generation functions including at least a first binarization threshold generation function and a second binarization threshold function; and generate a bi-level pixel value from said input pixel value based on a comparison of said input pixel value to a binarization threshold (T) generated by the selected binarization threshold generation function; and memory coupled to said at least one processor. In some such embodiments, the at least one processor is further configured to: determine if the ratio of the first variance (v1[P]) to the second variance (v2[P]) is less than a variance threshold (L); and select to use the second binarization threshold generation function when the ratio of the first variance (v1[P]) to the second variance (v2[P]) is less than a variance threshold (L), as part of being configured to select a binarization threshold generation function from a plurality of binarization threshold generation functions. In some embodiments, said first binarization threshold generation function generates said binarization threshold from pixel values included in said first window without use of pixel values from portions of said second window which are not included in said first window; and said second binarization threshold generation function generates said binarization threshold from a weighted sum of a first binarization parameter (t1[P]) generated based on the first variance and a second binarization parameter (t2[P]) generated based on the second variance (v2[P]).

An exemplary method of generating bi-level pixel values from a set of input pixel values corresponding to an image, in accordance with some embodiments, includes: determining a pixel value binarization threshold (T) for an input pixel value being processed based on at least a first non-zero integer power value of a first variance and a second non-zero integer power value of the first variance, said first variance being the variance of input pixel values in a first (primary) window, said first window being of a first size and including the input pixel value being processed; and generating a bi-level pixel value from said input pixel value based on a comparison of said input pixel value to said pixel value binarization threshold. In some such embodiments, determining a pixel value binarization threshold does not involve use of a fractional power of said first variance.

In various embodiments, the exemplary method further includes: determining said first variance (v1[P]) from input pixel values in a first window of said image, said first window being of a first size and including the input pixel value being processed; determining a second variance (v2[P]), said second variance being a variance of input pixel values in a second window of said image, said second window at least partially overlapping said first window, and including said input pixel value being processed in addition to at least some pixel values not included in said first window; and said binarization threshold (T) for an input pixel value being processed is further based on said second variance.

In some such embodiments, said pixel value binarization threshold is based on a weighed sum of a value generated based on the first variance and a value generated based on the second variance when said second variance is greater than said first variance.

An exemplary computer program product, for use in a computer, in accordance with some embodiments, comprises: a non-transitory computer readable medium comprising: code for causing said computer to determine a pixel value binarization threshold (T) for an input pixel value being processed based on at least a first non-zero integer power value of a first variance and a second non-zero integer power value of the first variance, said first variance being the variance of input pixel values in a first (primary) window, said first window being of a first size and including the input pixel value being processed; and code for causing said computer to generate a bi-level pixel value from said input pixel value based on a comparison of said input pixel value to said pixel value binarization threshold.

An exemplary computer, in accordance with some embodiments, comprises: at least one processor configured to: determine a pixel value binarization threshold (T) for an input pixel value being processed based on at least a first non-zero integer power value of a first variance and a second non-zero integer power value of the first variance, said first variance being the variance of input pixel values in a first (primary) window, said first window being of a first size and including the input pixel value being processed; and generate a bi-level pixel value from said input pixel value based on a comparison of said input pixel value to said pixel value binarization threshold; and memory coupled to said at least one processor. In some such embodiments, determining a pixel value binarization threshold does not involve use of a fractional power of said first variance. In some embodiments, the at least one processor is further configured to: determine said first variance (v1[P]) from input pixel values in a first window of said image, said first window being of a first size and including the input pixel value being processed; determine a second variance (v2[P]), said second variance being a variance of input pixel values in a second window of said image, said second window at least partially overlapping said first window, and including said input pixel value being processed in addition to at least some pixel values not included in said first window; and said at least one processor is configured to further base said determination on said second variance, as part of being configured to determine a pixel binarization threshold.

The techniques of various embodiments may be implemented using software, hardware and/or a combination of software and hardware. Various embodiments are directed to apparatus, e.g., an image processing device or system. Various embodiments are also directed to methods, e.g., a method of generating bi-level pixel values from a set of input pixel values corresponding to an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of generating bi-level pixel values from a set of input pixel values corresponding to an image, the method comprising:
    determining a first variance, said first variance being a variance of input pixel values in a first window of said image, said first window being of a first size and including an input pixel value being processed;
    determining a second variance, said second variance being a variance of input pixel values in a second window of said image, said second window at least partially overlapping said first window and including said input pixel value being processed in addition to at least some pixel values not included in said first window;
    selecting, based on said first variance and said second variance, a binarization threshold generation function from a plurality of binarization threshold generation functions, said plurality of binarization threshold generation functions including at least a first binarization threshold generation function and a second binarization threshold function; and
    generating a bi-level pixel value from said input pixel value based on a comparison of said input pixel value to a binarization threshold generated by the selected binarization threshold generation function.

2. The method of claim 1, wherein selecting a binarization threshold generation function from a plurality of binarization threshold generation functions includes:
    selecting between the first binarization threshold generation function and the second binarization threshold generation function based on the value of the first variance relative to the value of the second variance.

3. The method of claim 2, wherein selecting a binarization threshold generation function from a plurality of binarization threshold generation functions includes:
    determining if the ratio of the first variance to the second variance is less than a variance threshold; and
    selecting to use the second binarization threshold generation function when the ratio of the first variance to the second variance is less than a variance threshold.

4. The method of claim 3, wherein said variance threshold is one, and
    wherein said second binarization threshold generation function is selected when the first variance is less than the second variance.

5. The method of claim 1, wherein said first binarization threshold generation function generates said binarization threshold based on at least a first non-zero integer power value of the first variance and a second non-zero integer power value of the first variance.

6. The method of claim 5, wherein said first binarization threshold generation function does not use of a fractional power of said first variance to generate said binarization threshold.

7. The method of claim 1,
    wherein said first binarization threshold generation function generates said binarization threshold from pixel values included in said first window without use of pixel values from portions of said second window which are not included in said first window; and
    wherein said second binarization threshold generation function generates said binarization threshold from a weighted sum of a first binarization parameter generated based on the first variance and a second binarization parameter generated based on the second variance.

8. The method of claim 7, wherein said second binarization threshold generation function generates said binarization threshold based on a first non-zero integer power value of the second variance.

9. The method of claim 1, further comprising:
    determining a third variance, said third variance being a variance of input pixel values in a third window of said image, said third window at least partially overlapping said first window, and including said input pixel value being processed in addition to at least some pixel values not included in said first window;
    wherein said plurality of binarization threshold generation functions further includes a third binarization threshold generation function which generates a binarization threshold based on said third variance; and
    wherein selecting a binarization threshold generation function from a plurality of binarization threshold generation functions is based on said third variance in addition to said first variance and second variance.

10. The method of claim 9, wherein said third binarization threshold generation function generates said binarization threshold based on a weighted sum of a first binarization parameter generated based on said first variance, a second binarization parameter generated based on said second variance and a third binarization parameter generated based on said third variance.

11. The method of claim 1, further comprising:
storing said bi-level pixel value on a storage device in a file including a set of bi-level pixel values representing said image or communicating said file including a set of bi-level pixel values representing said image to another device.

12. The method of claim 1, further comprising:
displaying, on a display device, a bi-level image generated from pixel values included in said set of pixel values.

13. A computer program product for use in a computer, the computer program product comprising:
a non-transitory computer readable medium comprising:
code for causing said computer to determine a first variance, said first variance being a variance of input pixel values in a first window of an image, said first window being of a first size and including an input pixel value being processed;
code for causing said computer to determine a second variance, said second variance being a variance of input pixel values in a second window of said image, said second window at least partially overlapping said first window and including said input pixel value being processed in addition to at least some pixel values not included in said first window;
code for causing said computer to select, based on said first variance and said second variance, a binarization threshold generation function from a plurality of binarization threshold generation functions, said plurality of binarization threshold generation functions including at least a first binarization threshold generation function and a second binarization threshold function; and
code for causing said computer to generate a bi-level pixel value from said input pixel value based on a comparison of said input pixel value to a binarization threshold generated by the selected binarization threshold generation function.

14. A computer comprising:
at least one processor configured to:
determine a first variance, said first variance being a variance of input pixel values in a first window of said image, said first window being of a first size and including an input pixel value being processed;
determine a second variance, said second variance being a variance of input pixel values in a second window of said image, said second window at least partially overlapping said first window and including said input pixel value being processed in addition to at least some pixel values not included in said first window;
select, based on said first variance and said second variance, a binarization threshold generation function from a plurality of binarization threshold generation functions, said plurality of binarization threshold generation functions including at least a first binarization threshold generation function and a second binarization threshold function; and
generate a bi-level pixel value from said input pixel value based on a comparison of said input pixel value to a binarization threshold generated by the selected binarization threshold generation function; and
memory coupled to said at least one processor.

15. The computer of claim 14, wherein said at least one processor is configured to:
determine if the ratio of the first variance to the second variance is less than a variance threshold; and
select to use the second binarization threshold generation function when the ratio of the first variance to the second variance is less than a variance threshold,
as part of being configured to select a binarization threshold generation function from a plurality of binarization threshold generation functions.

16. A method of generating bi-level pixel values from a set of input pixel values corresponding to an image, the method comprising:
determining a pixel value binarization threshold for an input pixel value being processed based on at least a first non-zero integer power value of a first variance and a second non-zero integer power value of the first variance, said first variance being the variance of input pixel values in a first window, said first window being of a first size and including the input pixel value being processed; and
generating a bi-level pixel value from said input pixel value based on a comparison of said input pixel value to said pixel value binarization threshold.

17. The method of claim 16, wherein determining a pixel value binarization threshold does not involve use of a fractional power of said first variance.

18. The method of claim 17, further comprising:
determining said first variance from input pixel values in a first window of said image, said first window being of a first size and including the input pixel value being processed;
determining a second variance, said second variance being a variance of input pixel values in a second window of said image, said second window at least partially overlapping said first window, and including said input pixel value being processed in addition to at least some pixel values not included in said first window;
wherein said binarization threshold for an input pixel value being processed is further based on said second variance.

19. The method of claim 18, wherein said pixel value binarization threshold is based on a weighed sum of a value generated based on the first variance and a value generated based on the second variance when said second variance is greater than said first variance.

20. A computer program product for use in a computer, the computer program product comprising:
a non-transitory computer readable medium comprising:
code for causing said computer to determine a pixel value binarization threshold for an input pixel value being processed based on at least a first non-zero integer power value of a first variance and a second non-zero integer power value of the first variance, said first variance being the variance of input pixel values in a first window, said first window being of a first size and including the input pixel value being processed; and
code for causing said computer to generate a bi-level pixel value from said input pixel value based on a comparison of said input pixel value to said pixel value binarization threshold.

* * * * *